(12) United States Patent
Yahata

(10) Patent No.: US 10,999,541 B2
(45) Date of Patent: May 4, 2021

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Kazuhiro Yahata, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/659,723

(22) Filed: Oct. 22, 2019

(65) Prior Publication Data
US 2020/0053301 A1 Feb. 13, 2020

Related U.S. Application Data
(63) Continuation of application No. PCT/JP2018/007239, filed on Feb. 27, 2018.

(30) Foreign Application Priority Data
May 2, 2017 (JP) .............................. JP2017-091707

(51) Int. Cl.
*H04N 5/357* (2011.01)
*H04N 5/213* (2006.01)
(Continued)

(52) U.S. Cl.
CPC ............. *H04N 5/357* (2013.01); *G06T 5/002* (2013.01); *H04N 9/045* (2013.01)

(58) Field of Classification Search
CPC ...... H04N 5/357; H04N 5/3572; H04N 5/363; H04N 5/217; H04N 5/367; H04N 5/213; H04N 1/57; H04N 1/648; H04N 1/409; H04N 9/045; H04N 9/04557; H04N 19/105; G06T 7/74; G06T 7/77; G06T 7/90; G06T 7/248; G06T 2207/20192; G06T 2207/20182
USPC .......... 348/241, 193, 470, 533, 208.13, 627; 382/254, 263, 266, 255, 162–167, 181, 382/190
See application file for complete search history.

(56) References Cited

U.S. PATENT DOCUMENTS 8,120,679 B2 * 2/2012 Ishiga .................... H04N 5/208
                                                     348/252
8,310,567 B2 * 11/2012 Kim ......................... H04N 9/64
                                                      348/242
(Continued)

FOREIGN PATENT DOCUMENTS

| JP | 2013-026669 | 2/2013 |
| JP | 2014-086956 | 5/2014 |
| JP | 2015-007917 | 1/2015 |

*Primary Examiner* — Marly S Camargo
(74) *Attorney, Agent, or Firm* — Venable LLP

(57) ABSTRACT

To generate a favorable image that suppresses the occurrence of pattern noise in a method of performing patch-based noise reduction for a RAW image. In order to attain this object, the image processing apparatus of the present invention includes a pixel setting unit; a patch setting unit; and a noise reduction unit. Then, the pixel setting unit sets, for one pixel of interest, at least two kinds of pixel whose positions are different in a minimum unit of the color filter array as the plurality of reference pixels. Further, the patch setting unit sets, for one pixel of interest, at least two kinds of reference patch whose shapes are different.

17 Claims, 23 Drawing Sheets

(51) Int. Cl.

| | |
|---|---|
| *H04N 5/217* | (2011.01) |
| *H04N 9/04* | (2006.01) |
| *G06T 5/00* | (2006.01) |
| *G06T 7/77* | (2017.01) |
| *H04N 1/58* | (2006.01) |
| *H04N 1/40* | (2006.01) |
| *H04N 19/10* | (2014.01) |

(56) References Cited

U.S. PATENT DOCUMENTS

| | | | |
|---|---|---|---|
| 9,330,442 B2 * | 5/2016 | Kang | G06T 5/002 |
| | | | 382/275 |
| 9,357,144 B2 * | 5/2016 | Hara | H04N 5/357 |
| | | | 348/241 |
| 2006/0257043 A1 * | 11/2006 | Chiu | G06K 9/40 |
| | | | 382/261 |
| 2010/0066871 A1 * | 3/2010 | Atanassov | H04N 5/3675 |
| | | | 348/246 |
| 2010/0097502 A1 * | 4/2010 | Hagiwara | H04N 5/3572 |
| | | | 348/222.1 |
| 2013/0208974 A1 * | 8/2013 | Nakano | G06T 7/001 |
| | | | 382/149 |
| 2014/0118581 A1 | 5/2014 | Sasaki et al. | H04N 9/646 |
| 2014/0334701 A1 * | 11/2014 | Ye | G06T 17/05 |
| | | | 382/131 |
| 2016/0148385 A1 | 5/2016 | Koshiba | G06T 7/0048 |
| 2018/0198977 A1 * | 7/2018 | Okumura | H04N 5/23229 |
| | | | 348/246 |
| 2019/0164008 A1 * | 5/2019 | Yahata | G06K 9/62 |
| | | | 382/219 |
| 2020/0118250 A1 * | 4/2020 | Takahama | G06T 8/002 |

* cited by examiner

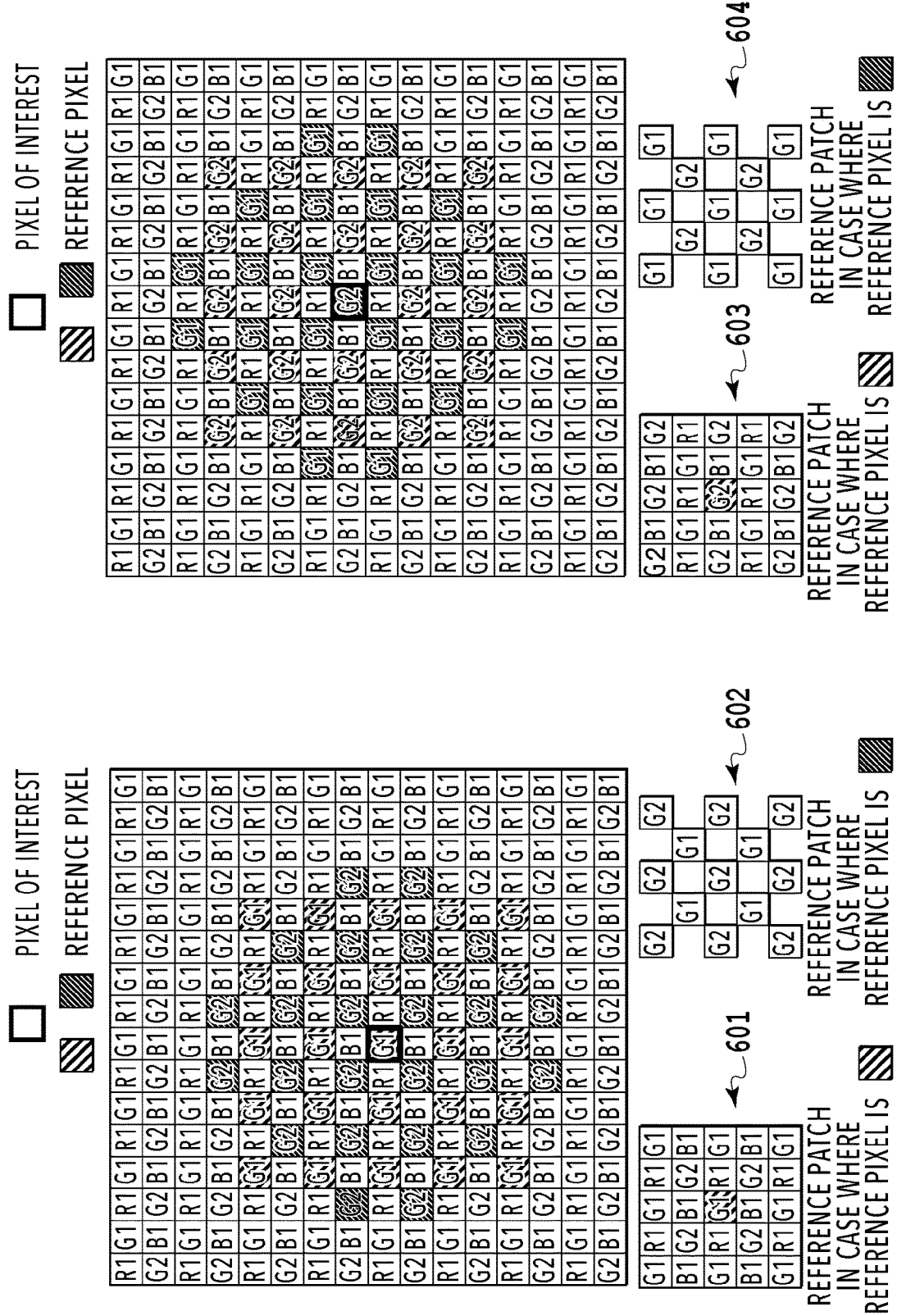

FIG.7A

NUMBER OF TIMES OF APPEARANCE

| | | | | |
|---|---|---|---|---|
| G1:0TIMES G2:0TIMES | G1:25TIMES G2:24TIMES | G1:0TIMES G2:0TIMES | G1:25TIMES G2:24TIMES | G1:0TIMES G2:0TIMES |
| G1:24TIMES G2:25TIMES | G1:0TIMES G2:0TIMES | G1:24TIMES G2:25TIMES | G1:0TIMES G2:0TIMES | G1:24TIMES G2:25TIMES |
| G1:0TIMES G2:0TIMES | G1:25TIMES G2:24TIMES | G1:0TIMES G2:0TIMES | G1:25TIMES G2:24TIMES | G1:0TIMES G2:0TIMES |
| G1:24TIMES G2:25TIMES | G1:0TIMES G2:0TIMES | G1:24TIMES G2:25TIMES | G1:0TIMES G2:0TIMES | G1:24TIMES G2:25TIMES |
| G1:0TIMES G2:0TIMES | G1:25TIMES G2:24TIMES | G1:0TIMES G2:0TIMES | G1:25TIMES G2:24TIMES | G1:0TIMES G2:0TIMES |

PIXEL OF INTEREST: R1

FIG.7B

NUMBER OF TIMES OF APPEARANCE

| | | | | |
|---|---|---|---|---|
| G1:25TIMES G2:24TIMES | G1:0TIMES G2:0TIMES | G1:25TIMES G2:24TIMES | G1:0TIMES G2:0TIMES | G1:25TIMES G2:24TIMES |
| G1:0TIMES G2:0TIMES | G1:25TIMES G2:24TIMES | G1:0TIMES G2:0TIMES | G1:24TIMES G2:25TIMES | G1:0TIMES G2:0TIMES |
| G1:25TIMES G2:24TIMES | G1:0TIMES G2:0TIMES | G1:25TIMES G2:24TIMES | G1:0TIMES G2:0TIMES | G1:25TIMES G2:24TIMES |
| G1:0TIMES G2:0TIMES | G1:24TIMES G2:25TIMES | G1:0TIMES G2:0TIMES | G1:24TIMES G2:25TIMES | G1:0TIMES G2:0TIMES |
| G1:25TIMES G2:24TIMES | G1:0TIMES G2:0TIMES | G1:25TIMES G2:24TIMES | G1:0TIMES G2:0TIMES | G1:25TIMES G2:24TIMES |

PIXEL OF INTEREST: G1

FIG.7C

NUMBER OF TIMES OF APPEARANCE

| | | | | |
|---|---|---|---|---|
| G1:24TIMES G2:25TIMES | G1:0TIMES G2:0TIMES | G1:24TIMES G2:25TIMES | G1:0TIMES G2:0TIMES | G1:24TIMES G2:25TIMES |
| G1:0TIMES G2:0TIMES | G1:25TIMES G2:24TIMES | G1:0TIMES G2:0TIMES | G1:25TIMES G2:24TIMES | G1:0TIMES G2:0TIMES |
| G1:24TIMES G2:25TIMES | G1:0TIMES G2:0TIMES | G1:24TIMES G2:25TIMES | G1:0TIMES G2:0TIMES | G1:24TIMES G2:25TIMES |
| G1:0TIMES G2:0TIMES | G1:25TIMES G2:24TIMES | G1:0TIMES G2:0TIMES | G1:25TIMES G2:24TIMES | G1:0TIMES G2:0TIMES |
| G1:24TIMES G2:25TIMES | G1:0TIMES G2:0TIMES | G1:24TIMES G2:25TIMES | G1:0TIMES G2:0TIMES | G1:24TIMES G2:25TIMES |

PIXEL OF INTEREST: G2

FIG.7D

NUMBER OF TIMES OF APPEARANCE

| | | | | |
|---|---|---|---|---|
| G1:0TIMES G2:0TIMES | G1:24TIMES G2:25TIMES | G1:0TIMES G2:0TIMES | G1:24TIMES G2:25TIMES | G1:0TIMES G2:0TIMES |
| G1:25TIMES G2:24TIMES | G1:0TIMES G2:0TIMES | G1:25TIMES G2:24TIMES | G1:0TIMES G2:0TIMES | G1:25TIMES G2:24TIMES |
| G1:0TIMES G2:0TIMES | G1:24TIMES G2:25TIMES | G1:0TIMES G2:0TIMES | G1:24TIMES G2:25TIMES | G1:0TIMES G2:0TIMES |
| G1:25TIMES G2:24TIMES | G1:0TIMES G2:0TIMES | G1:25TIMES G2:24TIMES | G1:0TIMES G2:0TIMES | G1:25TIMES G2:24TIMES |
| G1:0TIMES G2:0TIMES | G1:24TIMES G2:25TIMES | G1:0TIMES G2:0TIMES | G1:24TIMES G2:25TIMES | G1:0TIMES G2:0TIMES |

PIXEL OF INTEREST: B1

FIG.10A

NUMBER OF TIMES OF APPEARANCE

| | | | | |
|---|---|---|---|---|
| G1:0TIMES G2:0TIMES | G1:25TIMES G2:0TIMES | G1:0TIMES G2:0TIMES | G1:25TIMES G2:0TIMES | G1:0TIMES G2:0TIMES |
| G1:0TIMES G2:25TIMES | G1:0TIMES G2:0TIMES | G1:0TIMES G2:25TIMES | G1:0TIMES G2:0TIMES | G1:0TIMES G2:25TIMES |
| G1:0TIMES G2:0TIMES | G1:25TIMES G2:0TIMES | G1:0TIMES G2:0TIMES | G1:25TIMES G2:0TIMES | G1:0TIMES G2:0TIMES |
| G1:0TIMES G2:25TIMES | G1:0TIMES G2:0TIMES | G1:0TIMES G2:25TIMES | G1:0TIMES G2:0TIMES | G1:0TIMES G2:25TIMES |
| G1:0TIMES G2:0TIMES | G1:25TIMES G2:0TIMES | G1:0TIMES G2:0TIMES | G1:25TIMES G2:0TIMES | G1:0TIMES G2:0TIMES |

PIXEL OF INTEREST: R1

FIG.10B

NUMBER OF TIMES OF APPEARANCE

| | | | | |
|---|---|---|---|---|
| G1:25TIMES G2:16TIMES | G1:0TIMES G2:0TIMES | G1:25TIMES G2:16TIMES | G1:0TIMES G2:0TIMES | G1:25TIMES G2:16TIMES |
| G1:0TIMES G2:0TIMES | G1:16TIMES G2:25TIMES | G1:0TIMES G2:0TIMES | G1:16TIMES G2:25TIMES | G1:0TIMES G2:0TIMES |
| G1:25TIMES G2:16TIMES | G1:0TIMES G2:0TIMES | G1:25TIMES G2:16TIMES | G1:0TIMES G2:0TIMES | G1:25TIMES G2:16TIMES |
| G1:0TIMES G2:0TIMES | G1:16TIMES G2:25TIMES | G1:0TIMES G2:0TIMES | G1:16TIMES G2:25TIMES | G1:0TIMES G2:0TIMES |
| G1:25TIMES G2:16TIMES | G1:0TIMES G2:0TIMES | G1:25TIMES G2:16TIMES | G1:0TIMES G2:0TIMES | G1:25TIMES G2:16TIMES |

PIXEL OF INTEREST: G1

FIG.10C

NUMBER OF TIMES OF APPEARANCE

| | | | | |
|---|---|---|---|---|
| G1:16TIMES G2:25TIMES | G1:0TIMES G2:0TIMES | G1:16TIMES G2:25TIMES | G1:0TIMES G2:0TIMES | G1:16TIMES G2:25TIMES |
| G1:0TIMES G2:0TIMES | G1:25TIMES G2:16TIMES | G1:0TIMES G2:0TIMES | G1:25TIMES G2:16TIMES | G1:0TIMES G2:0TIMES |
| G1:16TIMES G2:25TIMES | G1:0TIMES G2:0TIMES | G1:16TIMES G2:25TIMES | G1:0TIMES G2:0TIMES | G1:16TIMES G2:25TIMES |
| G1:0TIMES G2:0TIMES | G1:25TIMES G2:16TIMES | G1:0TIMES G2:0TIMES | G1:25TIMES G2:16TIMES | G1:0TIMES G2:0TIMES |
| G1:16TIMES G2:25TIMES | G1:0TIMES G2:0TIMES | G1:16TIMES G2:25TIMES | G1:0TIMES G2:0TIMES | G1:16TIMES G2:25TIMES |

PIXEL OF INTEREST: G2

FIG.10D

NUMBER OF TIMES OF APPEARANCE

| | | | | |
|---|---|---|---|---|
| G1:0TIMES G2:0TIMES | G1:0TIMES G2:25TIMES | G1:0TIMES G2:0TIMES | G1:0TIMES G2:25TIMES | G1:0TIMES G2:0TIMES |
| G1:25TIMES G2:0TIMES | G1:0TIMES G2:0TIMES | G1:25TIMES G2:0TIMES | G1:0TIMES G2:0TIMES | G1:25TIMES G2:0TIMES |
| G1:0TIMES G2:0TIMES | G1:0TIMES G2:25TIMES | G1:0TIMES G2:0TIMES | G1:0TIMES G2:25TIMES | G1:0TIMES G2:0TIMES |
| G1:25TIMES G2:0TIMES | G1:0TIMES G2:0TIMES | G1:25TIMES G2:0TIMES | G1:0TIMES G2:0TIMES | G1:25TIMES G2:0TIMES |
| G1:0TIMES G2:0TIMES | G1:0TIMES G2:25TIMES | G1:0TIMES G2:0TIMES | G1:0TIMES G2:25TIMES | G1:0TIMES G2:0TIMES |

PIXEL OF INTEREST: B1

☐ PIXEL OF INTEREST
▨ REFERENCE PIXEL

FIG.17B

☐ PIXEL OF INTEREST
▨ REFERENCE PIXEL

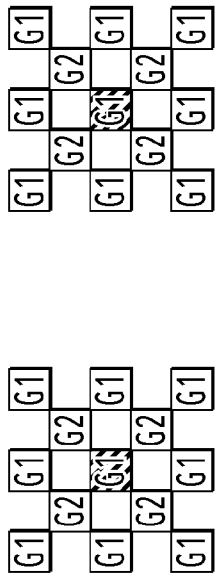
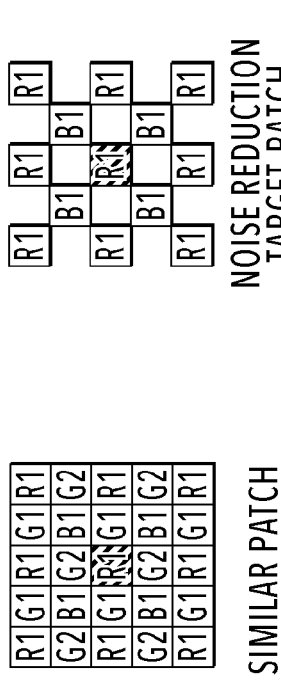
FIG.22A
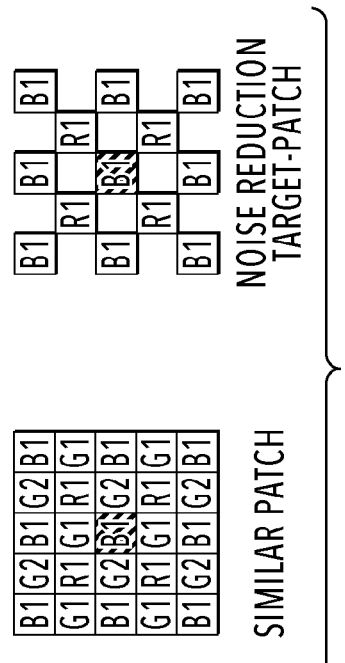
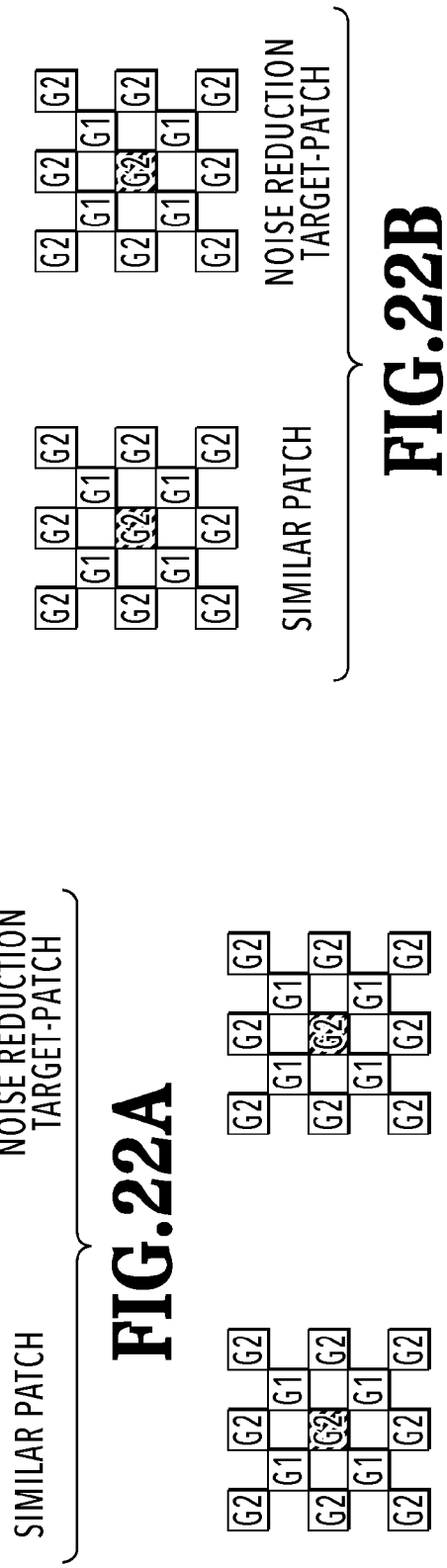
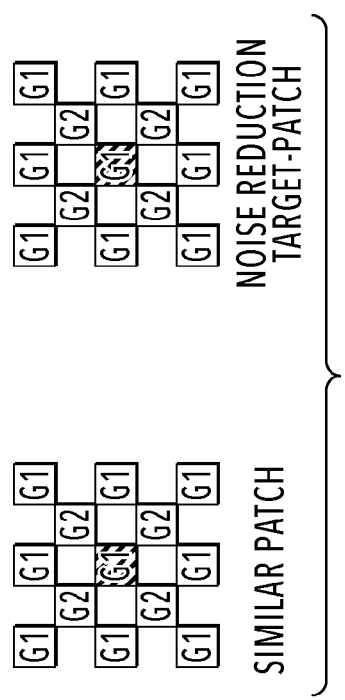
FIG.22B
FIG.22C
FIG.22D

IMAGE PROCESSING APPARATUS, IMAGE PROCESSING METHOD AND STORAGE MEDIUM

CROSS-REFERENCE TO RELATED APPLICATIONS

This application is a Continuation of International Patent Application No. PCT/JP2018/007239, filed Feb. 27, 2018, which claims the benefit of Japanese Patent Application No. 2017-091707, filed May 2, 2017, both of which are hereby incorporated by reference herein in their entirety.

BACKGROUND OF THE INVENTION

Field of the Invention

The present invention relates to a technique to reduce noise of a captured image.

Background Art

In an image captured by a camera, noise is included and the amount of noise is large particularly at the time of high-sensitivity image capturing. In order to reduce noise, a large number of techniques to reduce noise included in a captured image are known. For example, Patent Document 1 has disclosed a method of generating a denoised image by generating a patch set from a captured image, performing noise reduction processing for all the patches belonging to the patch set, and further performing composition processing of these patches. In the method of Patent Document 1, as an input image, an image in which each pixel within the image has the same level color information, that is, a grayscale image having color information on one color for each pixel or an RGB image having color information on three colors of RGB for one pixel is supposed.

CITATION LIST

Patent Literature

PTL 1 Japanese Patent Laid-Open No. 2013-026669
PTL 2 Japanese Patent Laid-Open No. 2014-086956

SUMMARY OF THE INVENTION

Here, a case is considered where a RAW image having different color information in accordance with a color filter for each pixel is taken as an input image and for example, the patch-based noise reduction processing as disclosed in Patent Document 1 is performed. In this case, in order to generate a patch set, it becomes necessary to set the shape of the patch in accordance with the arrangement of the color filter. In this point, for example, Patent Document 2 has disclosed a technique to change the patch shape in accordance with the arrangement of the color filter in order to perform noise reduction appropriately for the RAW image. However, there is a case where generating a patch set by using the technique of Patent Document 2 causes pattern noise to occur in a noise reduced image.

Consequently, an object of the present invention is to generate a favorable image that suppresses the occurrence of pattern noise in a method of performing patch-based noise reduction for a RAW image.

The image processing apparatus according to the present invention is an image processing apparatus that reduces noise of an image, the image processing apparatus including: a pixel setting unit configured to set a pixel of interest and a plurality of reference pixels for the pixel of interest among pixels configuring the image; a patch setting unit configured to set a patch of interest configured by a plurality of pixels with the pixel of interest as a criterion and a plurality of reference patches configured by a plurality of pixels with each of the plurality of reference pixels as a criterion; and a noise reduction unit configured to perform noise reduction processing based on the patch of interest and the plurality of reference patches, and the image has a color for each pixel, which corresponds to a color filter array having periodicity, and is an image in which a unit pixel group including pixels corresponding to a plurality of color components is arranged repeatedly, in the unit pixel group, a plurality of pixels exists for at least one color, and the patch setting unit sets, for the patch of interest, a first reference patch to which a pixel whose color array of peripheral pixels and whose color component are the same corresponds and a second reference patch to which a pixel whose color array of peripheral pixels are different but whose color component is the same corresponds.

Further features of the present invention will become apparent from the following description of exemplary embodiments with reference to the attached drawings.

BRIEF DESCRIPTION OF THE DRAWINGS

FIG. 6A and FIG. 6B are each a diagram showing an example of a pixel of interest, reference pixels, and reference patches, which are set in a method of the first embodiment;

FIG. 7A to FIG. 7D are each a diagram showing the number of times of appearance of a G1 pixel and that of a G2 pixel at each pixel position in a case where reference patches of the first embodiment are overlapped;

FIG. 10A to FIG. 10D are each a diagram showing the number of times of appearance of the G1 pixel and that of the G2 pixel at each pixel position in a case where reference patches of a conventional example are overlapped;

FIG. 11A and FIG. 11B are each a diagram showing an example of a pixel of interest, reference pixels, and reference patches, which are set in a method of the first embodiment;

FIG. 17A and FIG. 17B are each a diagram showing an example of a pixel of interest and reference pixels in a third embodiment;

FIG. 22A to FIG. 22D are each a diagram showing an example of a noise reduction target-patch.

DESCRIPTION OF THE EMBODIMENTS

In the following, aspects for embodying the present invention are explained by using the drawings. Embodiments are not intended to limit the present invention and all configurations explained in the embodiments are not necessarily indispensable to the solution for solving problems of the present invention.

First Embodiment

Figure 1:
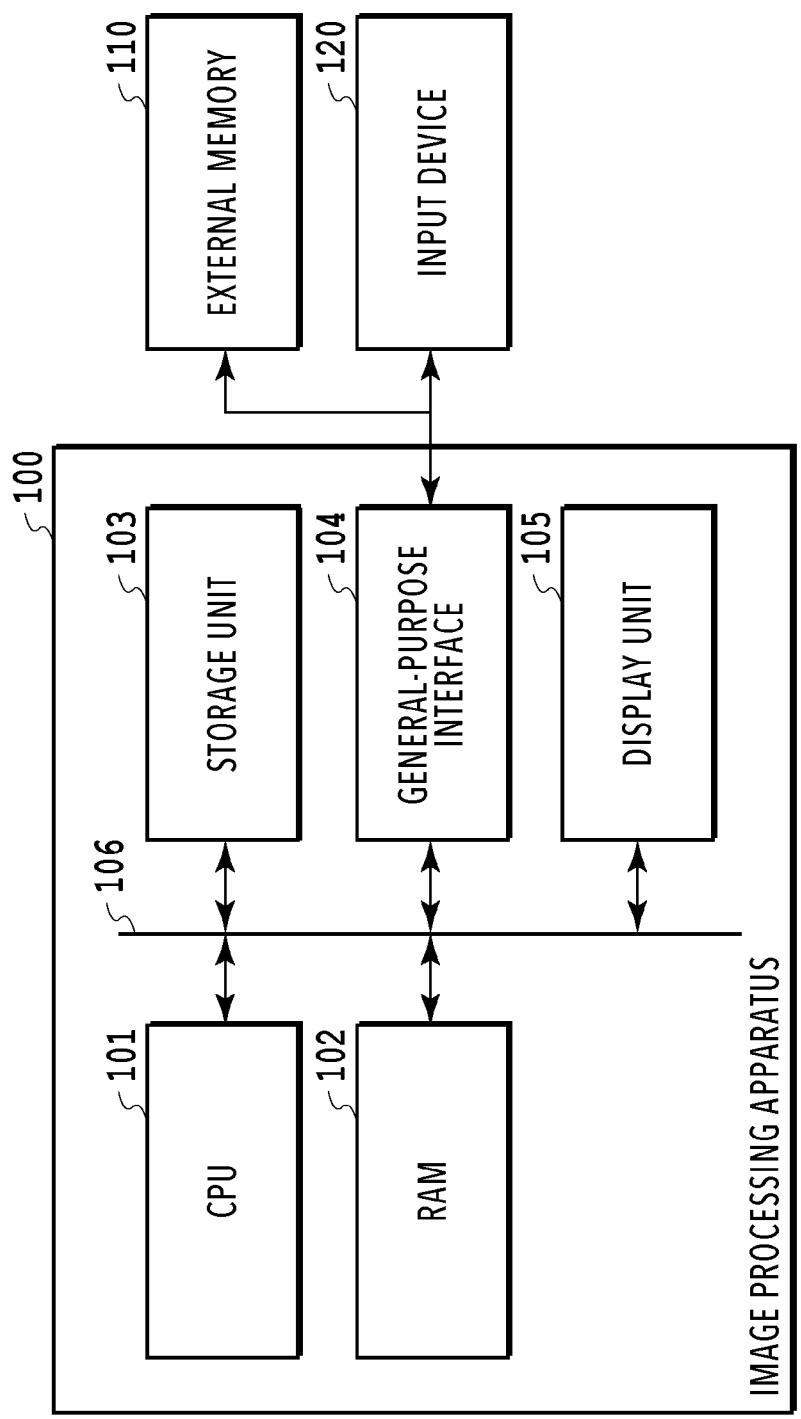
FIG. 1 is a block diagram showing a hardware configuration of an image processing apparatus.

In the present embodiment, an aspect is explained in which patch-based noise reduction processing is implemented by software. FIG. 1 is a block diagram showing the hardware configuration of an image processing apparatus according to the present embodiment. In FIG. 1, an image processing apparatus 100 includes a CPU 101, a RAM 102, a storage unit 103, a general-purpose interface 104, and a display unit 105 and these are connected to one another via a main bus 106. Then, via the general-purpose interface 104, an external memory 110 and an input device 120, such as a mouse and a keyboard, are connected to the main bus 106. The storage unit 103 is a storage device, such as HDD and SSD. The display unit 105 is a liquid crystal display, an organic EL display, or the like.

In the following, various kinds of processing that are implemented by the CPU 101 running various kinds of software (computer programs) stored in the storage unit 103 are described. First, the CPU 101 activates an image processing program stored in the storage unit 103 and loads the program onto the RAM 102 and at the same time, displays a user interface screen (hereinafter, UI screen) on the display unit 105. Following the above, in accordance with instructions from a user through the input device 120, the CPU 101 reads RAW image data stored in the external memory 110 in the RAM 102. Further, in accordance with instructions from a user, the CPU 101 performs noise reduction processing for the RAW image data stored in the RAM 102. The image data after noise reduction processing, is stored again in the RAM 102. The image data after noise reduction processing stored in the RAM 102 is subjected to a predetermined output, such as display on the display unit 105 and storage in the external memory 110, after a series of processing is performed in accordance with instructions from a user. The RAW image data that is the target of noise reduction processing may be stored in the storage unit 103, in addition to the external memory 110, or may be read from the server in the RAM 102 via a network, not shown schematically.

Following the above, patch-based noise reduction processing in which a RAW image is taken to be an input image, which is the premise of the present invention, is reviewed. In the patch-based noise reduction processing, first, a plurality of pixels in the RAW image is set as pixels of interest and a patch set is generated for each pixel of interest. Next, noise of each patch included in the generated patch set is reduced. For the noise reduction at this time, in addition to the method of Patent Document 1 described previously, for example, a method, such as an NL Bayes method, is used. The NL Bayes method is explained briefly. First, the average value of each pixel of the patch and a covariance matrix that is calculated by calculating a sum of the product of two arbitrary pixel values of each patch for all patches of the patch set are calculated. By the average value and the covariance matrix, a priori probability that the pixel value of an ideal image without noise follows is modeled (supposed). Next, by using Bayes' theorem represented by "posteriori probability=likelihood×priori probability", the pixel value of the patch, which maximizes the posteriori probability is determined. That is, the modeled priori probability and the noise variance of the image (depending on the imaging sensor of the camera) measured in advance, which corresponds to the likelihood, are applied to the above-described Bayes' theorem and the pixel value of each patch is determined so as to maximize the posteriori probability. Due to this, a patch in which noise is reduced is obtained. Then, by composing each patch after noise reduction, a RAW image in which noise is reduced is generated. This patch composition processing is called aggregation and the like. Specifically, each patch after noise reduction is returned to the original patch position in the RAW image and for the pixel at which a plurality of patches overlaps, averaging or weighted averaging based on the similarity level is performed. The above is the contents of the noise reduction processing by the NL Bayes method.

In the present embodiment, on the premise that the patch-based noise reduction processing as described above is performed, by devising how to generate a patch set, the occurrence of pattern noise is suppressed in the RAW image after noise reduction.

Definition of Terms

Here, the terms in the present specification are reviewed. "Patch" means an area of a geometrical figure in the shape of a rectangle or in a checkered pattern, corresponding to a part of a RAW image, which is an input image, and is configured by a plurality of pixels. A patch configured by a plurality of pixels with the pixel of interest as a criterion among the pixels within the RAW image is called "patch of interest" in the following. Then, a patch that is set on the periphery of the patch of interest, which is referred to at the time of performing noise reduction for the patch of interest, is called "reference patch". The reference patch is a patch configured by a plurality of pixels with the reference pixel as a criterion. For one pixel of interest, a plurality of reference pixels is set, and therefore, a plurality of reference patches exists for one pixel of interest. The patch set described previously is a set of reference patches whose similarity level with the patch of interest is high among a plurality of reference patches. It may also be possible for the patch of interest itself to be included in a plurality of reference patches.

Figure 2:
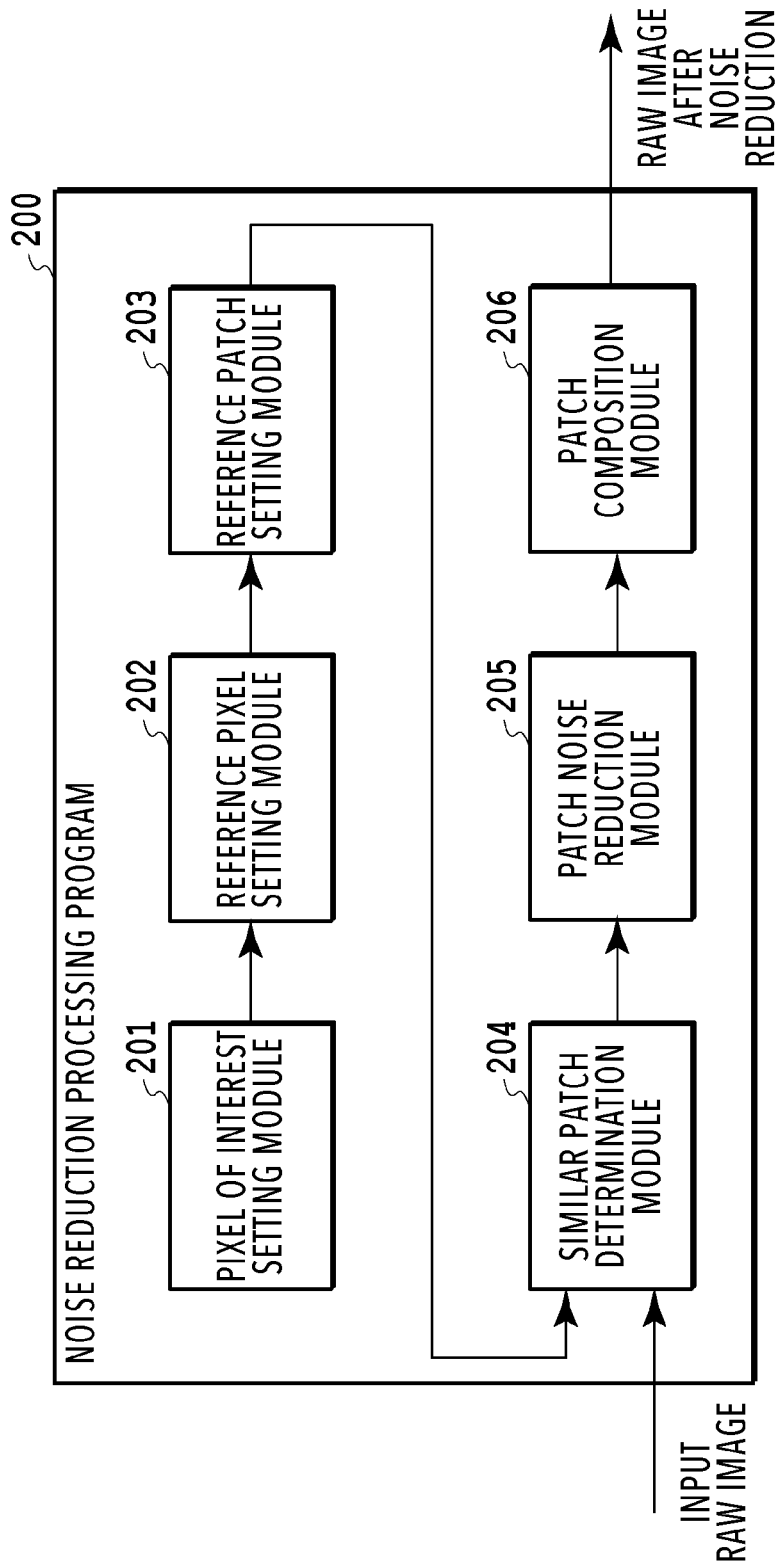
FIG. 2 is a block diagram showing details of a noise reduction processing program according to a first embodiment.

In the present embodiment, an aspect is explained in which the patch-based noise reduction processing as described above is implemented by software. That is, the patch-based noise reduction processing is implemented by a noise reduction processing program being loaded onto the RAM 102 and being executed by the CPU 101. FIG. 2 is a block diagram showing details of the noise reduction processing program according to the present embodiment. A noise reduction processing program 200 includes each of modules 201 to 206, that is, the pixel of interest setting module 201, the reference pixel setting module 202, the reference patch setting module 203, the similar patch determination module 204, the patch noise reduction module 205, and the patch composition module 206. In the following, each module is explained.

The pixel of interest setting module 201 generates coordinate values specifying an arbitrary pixel for the RAW image as the input image and sets a pixel of interest. The reference pixel setting module 202 sets a plurality of reference pixels to be caused to correspond to the set pixel of interest. The reference patch setting module 203 sets a patch of interest and a plurality of reference patches based on the pixel of interest and the plurality of reference pixels, which are set. The feature of the present embodiment is how to set the pixel of interest, the patch of interest, the reference pixel, and the reference patch. Details thereof will be described later. The similar patch determination module 204 determines a similar patch whose similarity level with the patch of interest is high among the plurality of set reference patches. The patch noise reduction module 205 reduces the noise of the determined similar patch. The patch composition module 206 performs composition of the similar patch in which noise is reduced (aggregation).

Figure 3:
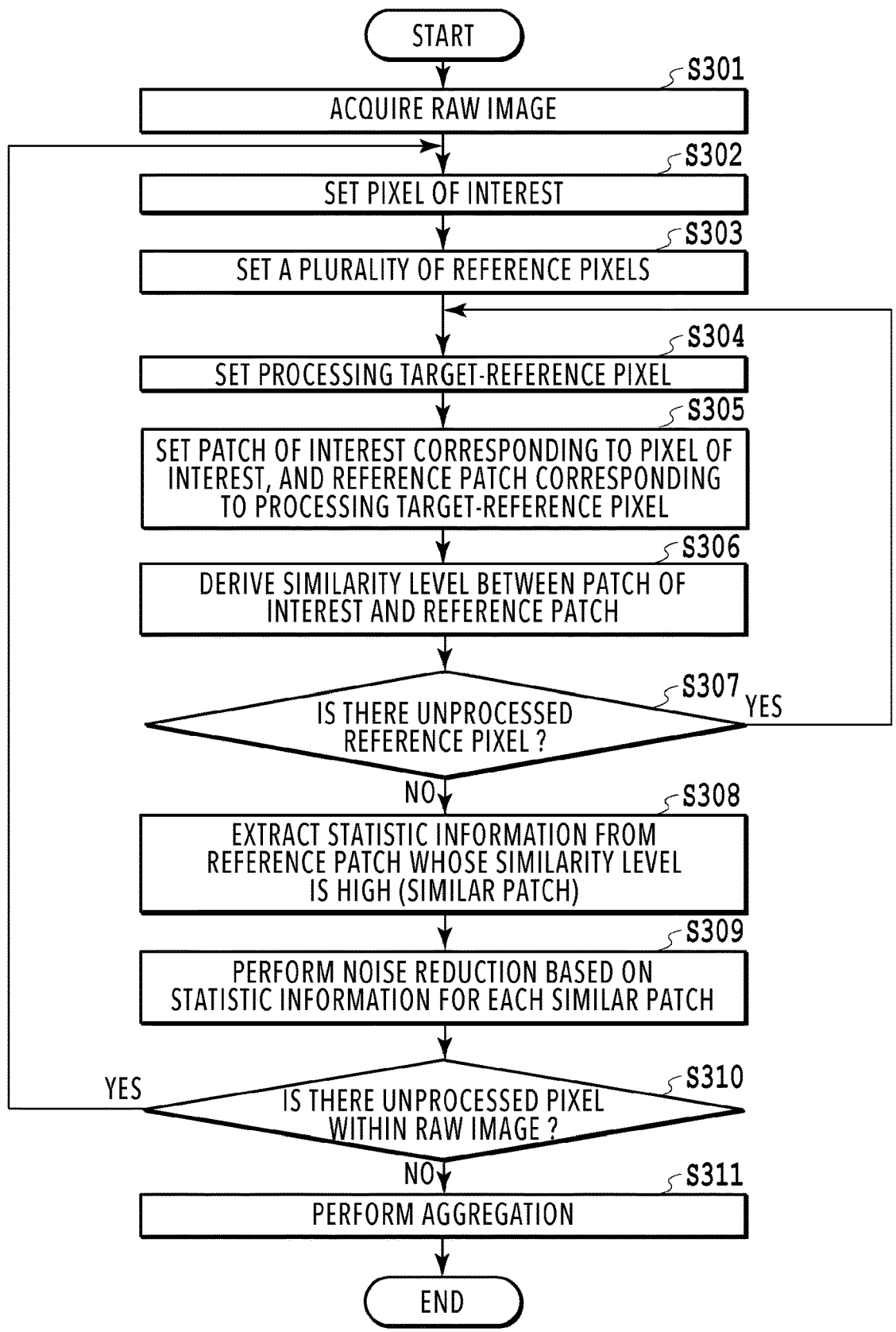
FIG. 3 is a flowchart showing a flow of noise reduction processing according to the present embodiment.

Following the above, a flow of specific processing of the noise reduction processing program 200 having the module configuration described above is explained. FIG. 3 is a flowchart showing a flow of the noise reduction processing according to the present embodiment. In the following, detailed explanation is given along the flow in FIG. 3.

At step 301, a RAW image as an input image is acquired. At step 302 that follows, a pixel of interest is set from the acquired RAW image. Then, at step 303, a plurality of reference pixels is set based on the color and the position on the image of the set pixel of interest. Further, at step 304, one reference pixel that is the processing target is determined among the plurality of set reference pixels. Then, at step 305, a patch of interest corresponding to the pixel of interest set at step 302 and a reference patch corresponding to the processing target-reference pixel determined at step 304 are set. Here, from the setting of the pixel of interest up to the setting of the reference patch, which are the feature of the present embodiment, are explained in detail with reference to a specific example.

Figure 4:
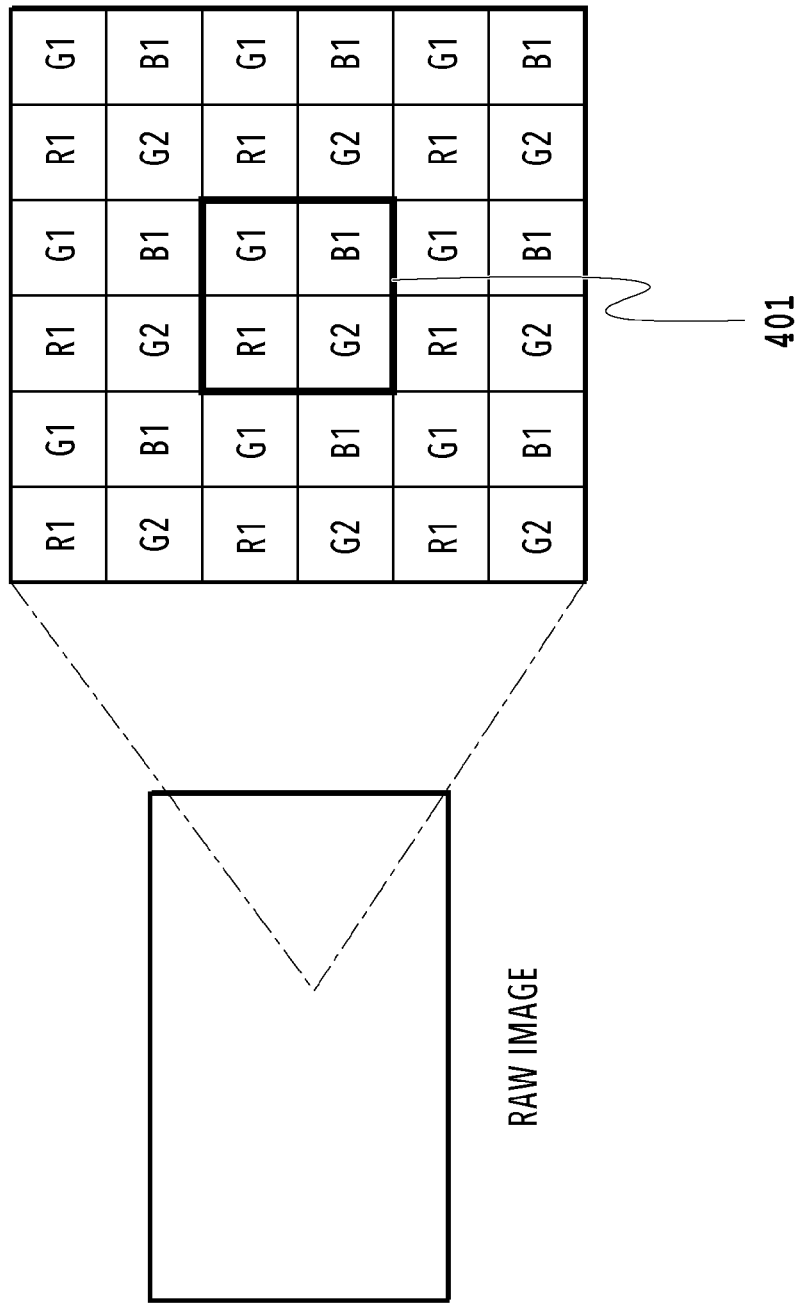
FIG. 4 is an enlarged diagram of a part of a RAW image that is a target of noise reduction processing.

FIG. 4 is an enlarged diagram of a part of the RAW image that is the target of the noise reduction processing of the present embodiment. As shown in FIG. 4, each pixel of the RAW image is associated with one color of red (R), green (G), and blue (B) in a color filter of the imaging sensor. The array of colors in the color filter has periodicity and in the color filter shown in FIG. 4, a square of 2×2 pixels indicated by a thick frame 401 is taken to be a minimum unit pixel group of repetition. Then, the color of each pixel at the top-left position in the pixel group of the minimum unit is R, that at the top-right position and the bottom-left position is and that at the bottom-right position is B. The array such as this of the color filter is called the Bayer array. As shown in FIG. 4, in the minimum unit pixel group in the Bayer array, a plurality of pixels corresponding to green exists. In order to distinguish the top-right pixel from the bottom-left pixel, both are the same in the present specification, different labels are attached (label attachment), such as that "G1" is attached to the top-right pixel and "G2" to the bottom-left pixel. For convenience of explanation, to R and B, "R1" and "B1" are attached, respectively. This ID indicates a position relationship for the color filter array.

Figures 5A, 5B:
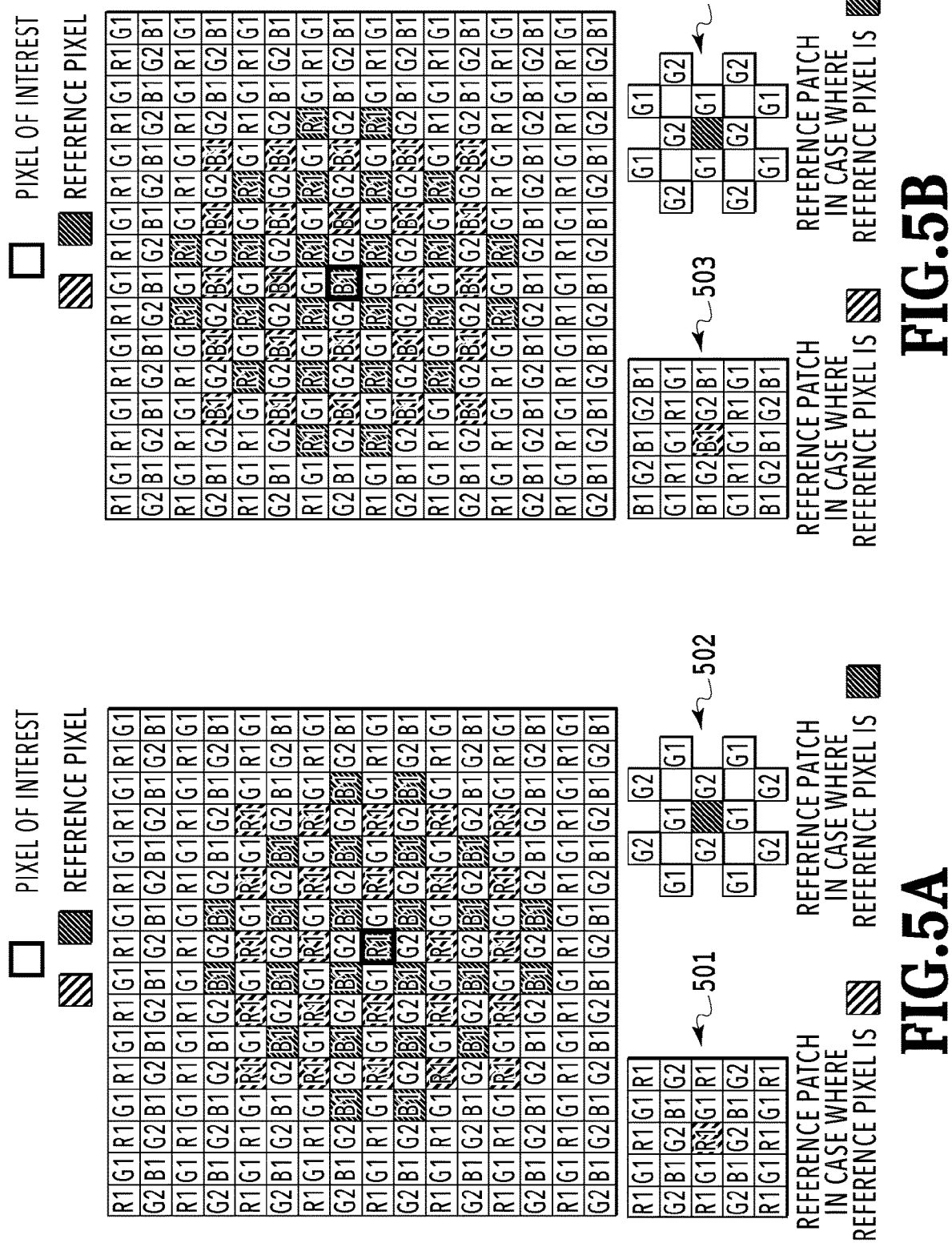
FIG. 5A and FIG. 5B are each a diagram showing an example of a pixel of interest, reference pixels, and reference patches, which are set in a method of the first embodiment.

FIG. 5A, FIG. 5B, FIG. 6A, and FIG. 6B are each a diagram showing an example of the pixel of interest, the reference pixels, and the reference patches, which are set by the method of the present embodiment in a case of the RAW image corresponding to the Bayer array shown in FIG. 4. The shape of the patch of interest is the same as the shape of the reference patch, and therefore, omitted. FIG. 5A shows a case where the label of the pixel of interest is R1 and FIG. 5B shows a case where that is B1, respectively. Further, FIG. 6A shows a case where the label of the pixel of interest is G1 and FIG. 6B shows a case where that is G2, respectively. As is obvious from FIG. 5A, FIG. 5B, FIG. 6A, and FIG. 6B, even in any of the cases where the label of the pixel of interest is R1, B1, G1, and G2, two kinds of pixel (=two kinds of pixel whose labels are different) whose positions in the minimum unit of the color filter array are different are set as the reference pixels. For example, in a case where the pixel of interest is the R1 pixel (FIG. 5A), for the pixel of interest indicated by the thick frame, the two kinds of pixel of R1 and B1 indicated by different slashes respectively are set as the reference pixels. Then, the R1 pixels as the reference pixels are arranged in the form of a square of 5×5 pixels with another pixel being between the adjacent pixels. On the other hand, the B1 pixels as the reference pixels are arranged in the form of a square of 4×4 pixels with another pixel being between the adjacent pixels, and in addition thereto, two pixels are arranged on the top, bottom, left and right sides thereof respectively, and therefore, a total of 24 pixels exist. At this time, the shape of the reference patch is different between a case where the reference pixel is R1 pixel and a case where the reference pixel is the B1 pixel. A patch 501 is the reference patch in a case where the R1 pixel is the reference pixel and the shape thereof is a 5×5 square with the reference pixel as a center. On the other hand, a patch 502 is the reference patch in a case where the B1 pixel is the reference pixel and the shape thereof is a checkered pattern with the reference pixel as a center, which is obtained by omitting the R1 pixels and the B1 pixels from the 5×5 square. Then, the number of constituent pixels of the reference patch 502 is 12, which is the sum of the six G1 pixels and the six G2 pixels. The reason the constituent pixels of the reference patch 502 do not include R1 and B1 in a case where the pixel of interest is R1 and the reference pixel thereof is B1 is that it is not possible to appropriately derive the similarity level, to be described later, because the color is different at the pixel position in a correspondence relationship in a case where the patch of interest and the reference patch are overlapped. It is assumed that a case where the same color appears at the pixel position in the correspondence position on a condition that the reference patch is overlapped is represented as that the phase matches (same phase) and a case where a different color appears is represented as that the phase does not match (different phase). That is, the "same phase" means that the color array of the peripheral pixels of the pixel of interest is the same and the "different phase" means that the color array of the peripheral pixels of the pixel of interest is different. As described above, in the patch setting of the present embodiment, for one pixel of interest, a patch to which the pixel whose color array of the peripheral pixels and whose color component are the same corresponds and a patch to which the pixel whose color array of the peripheral pixels is different but whose color component is the same corresponds are set. Consequently, for the pixel of interest, two kinds of reference patch whose shapes are different are set. At least two kinds of shape of the reference patch exist, and therefore, two kinds of shape of the patch of interest exist, corresponding to the shapes of the reference patch. This is also true with a case where the pixel of interest is the G1 pixel, a case where that is the G2 pixel, and a case where that is the B1 pixel. For example, as the reference pixel in a case where the pixel of interest is the G1 pixel (FIG. 6A), the two kinds of G1 pixel and the G2 pixel are set, whose positions in the minimum unit of the color filter array are different. At this time, the number of G1 pixels as the reference pixels is 25 and the number of G2 pixels is 24, and as the reference patches, two kinds of patches, that is, a patch 601 in the shape of a square including 25 pixels and a patch 602 in a checkered pattern including 13 pixels, are set in accordance with the reference pixel.

Figures 8A, 8B:
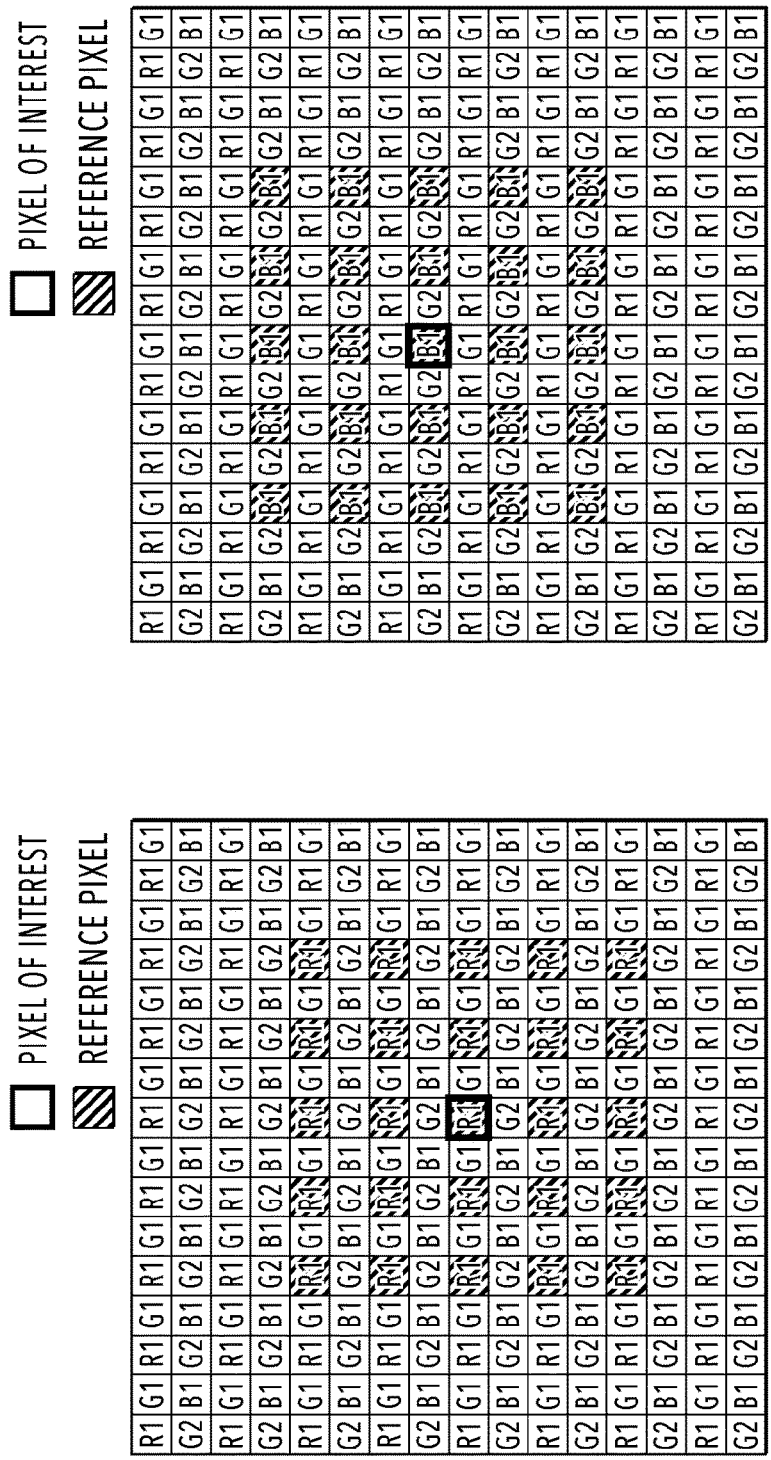
FIG. 8A and FIG. 8B are each a diagram showing an example of a conventional patch setting.
Figures 9A, 9B:
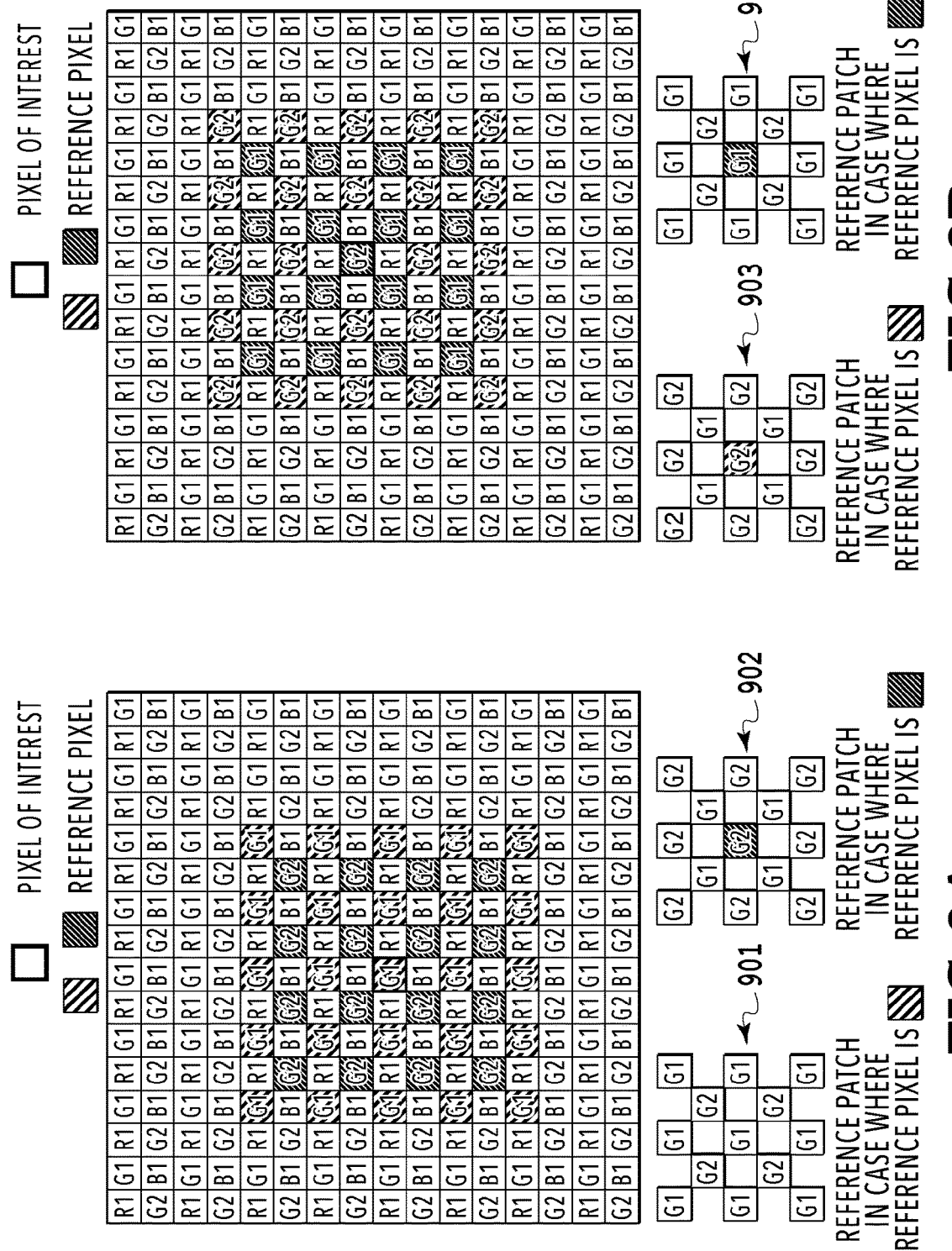
FIG. 9A and FIG. 9B are each a diagram showing an example of a conventional patch setting.

The feature of the patch setting as described above is that in a case where all the reference patches are overlapped with the position of the reference pixel as a criterion, at an arbitrary pixel position at which the pixel having the color of the G component appears, both the G1 pixel and the G2 pixel appear. FIG. 7A to FIG. 7D are each a diagram showing the number of times of appearance of the G1 pixel and that of the G2 pixel respectively at the pixel position in the correspondence relationship in a case the 25 reference patches in the same phase and the 24 reference patches in the different phase are overlapped. FIG. 7A FIT. 7A corresponds to FIG. 5A, FIG. 7B to FIG. 5B, FIG. 7C to FIG. 6a, and FIG. 7D to FIG. 6B, respectively. It is known that at the pixel position at which one of the pixels appears, the other also appears without exception. Here, for a comparison, examples of the conventional patch setting that causes pattern noise to occur are shown in FIG. 8A, FIG. 8B, FIG. 9A, and FIG. 9B. FIG. 8A shows a case where the pixel of interest is the R1 pixel, FIG. 8B shows a case where that is the B1 pixel, FIG. 9A shows a case where that is the G1 pixel, and FIG. 9B shows a case where that is the G2 pixel, respectively. Then, FIG. 10A to FIG. 10D are each a diagram corresponding to FIG. 7A to FIG. 7D described above in a case of the conventional patch setting and showing the number of times of appearance of the G1 pixel and that of the G2 pixel at the pixel position in the correspondence relationship in a case where reference patches are overlapped for each pixel of interest. At this time, although not shown schematically, in FIG. 10A, 25 reference patches 801 in the same phase are overlapped and in FIG. 10D also, 25 reference patches 802 in the same phase are overlapped. Further, in FIG. 10B, 25 reference patches 901 in the same phase and 16 reference patches 902 in the different phase are overlapped and in FIG. 10C also, 25 reference patches 911 in the same phase and 16 reference patches 912 in the different phase are overlapped.

In FIG. 7A to FIG. 7D of the present embodiment, both G1 and G2 appear at the same pixel position, but in FIG. 10A to FIG. 10D of the conventional example, in a case where the pixel of interest is the R1 pixel or the B1 pixel, only one of G1 and G2 appears at each pixel position. As described above, in a case where the number of times of appearance of the G1 pixel and that of the G2 pixel are uneven, in the noise reduction processing and the composition processing, a trend becomes stronger that averaging is performed by using only the G1 pixels for the G1 pixel and by using only the G2 pixels for the G2 pixel. In this situation, despite the same color of the G component originally, G1 and G2 are handled as separate colors, and therefore, that the pixel value is different between the G1 pixel and the G2 pixel even at the pixel position at which the pixel value is the same in a case where there is no noise occurs stochastically. The occurrence of a difference in the pixel value between the G1 pixel and the G2 pixel as described above is the cause of the occurrence of pattern noise.

Explanation is returned to the flow in FIG. 3. At step 306, the similarity level between the patch of interest and the reference patch is derived, which are set as above. As this similarity level, for example, the sum of difference absolute value or the sum of difference square of the pixel value of each pixel configuring the respective patches is used. Alternatively, it may also be possible to regard the pixel values of a plurality of pixels included in the patch of interest and the reference patch as respective vectors and take the inner product of the vectors or the various norms of the difference vectors, which are well known, as the similarity level.

At step 307, whether all the plurality of reference pixels set at step 303 is processed is determined. In a case where there is an unprocessed reference pixel, the processing returns to step S304 and the next processing target-reference pixel is determined. On the other hand, in a case where all the reference pixels are processed, the processing advances to step 308.

At step 308, based on the similarity level derived at step 306, statistic information is extracted from one or more reference patches whose similarity level is high (hereinafter, called "similar patch"). Specifically, the reference patch whose derived similarity level is higher than or equal to a predetermined threshold value is specified as the similar patch, the statistic analysis of the similar patch is performed by taking into consideration the difference in the geometrical shape of the specified similar patch, and thus the statistic information is extracted. The statistic information extracted here is the average value or the covariance matrix of the similar patch in the NL Bayes method and in the method of Patent Document 1, the eigenvalue and the eigenvector are further included. In order to take into consideration the difference in shape, for example, it is sufficient to exclude the pixel of the kind (label) not included in the similar patch from the target of the arithmetic operation at the time of finding the average value and the covariance matrix.

At step 309, for each similar patch, noise reduction processing based on the statistic information extracted from each similar patch is performed. The data of the similar patch after the noise reduction processing is saved temporarily in the RAM 102 in preparations for aggregation. Then, at step 310, whether the processing is completed for all the pixels within the input RAW image is determined. In a case where there is an unprocessed pixel, the processing returns to step 302, and the next pixel is determined to be the pixel of interest and the processing is continued. On the other hand, in a case where the processing is completed for all the pixels, the processing advances to step 311. Then, at step 311, processing (aggregation) to compose a similar patch group after the noise reduction obtained for each pixel configuring the input RAW image is performed and the RAW image for which noise reduction has been performed is obtained.

The above is the contents of the noise reduction processing according to the present embodiment, which is implemented by the noise reduction processing program 200. In the flow in FIG. 3, after the similar patches after noise reduction are acquired for all the pixels, aggregation is performed en bloc, but this is not limited. Originally, the reference patch is not set at a position extremely apart from the patch of interest, and therefore, the range of the similar patches necessary for aggregation at a certain pixel position is limited. Consequently, it may also be possible to perform aggregation as needed at the point in time at which necessary similar patches are obtained and sequentially output pixel data whose value is settled.

With the method of the present embodiment, as described above, even in a case where the pixel of interest is the R1 pixel, the B1 pixel, the G1 pixel, or the G2 pixel, the patch setting is performed so that the number of times of appearance of the G1 pixel and that of the G2 pixel are not uneven. Due to this, the G1 pixel and the G2 pixel having the same G component are handled as the pixel of the same color in the noise reduction processing and the composition processing and as a result of this, the occurrence of pattern noise is suppressed.

The smaller the difference in the number of times of appearance between the G1 pixel and the G2 pixel, the more the pattern noise is suppressed. In the examples shown in FIG. 7A to FIG. 7D, the difference in the number of times of appearance is only one, and therefore, it is possible to suppress the pattern noise to an unrecognizable level.

The case where the color filter array is the Bayer array is summarized as follows. First, in a case where the pixel of interest is the R1 pixel or the B1 pixel, both the R1 pixel and the B1 pixel are included in the reference pixels. Further, in a case where the pixel of interest is the G1 pixel or the G2 pixel, both the G1 pixel and the G2 pixel are included in the reference pixels (both the pixel whose position with respect to the color filter array of the reference pixel is the same as that of the pixel of interest and the pixel located at the position in the oblique direction thereof are included). Then, the reference patch is caused to have a shape in which only the pixels whose color is the same as that of the pixel in the correspondence relationship between the patch of interest and the reference patch are selected. By performing the patch setting as described above, it is possible to avoid such a situation in which one of the number of times of appearance of the G1 pixel and that of the G2 pixel becomes 0 despite that the G1 pixel and the G2 pixel are the pixels of the same G component, and therefore, it is possible to suppress the pattern noise.

Figures 11A, 11B:
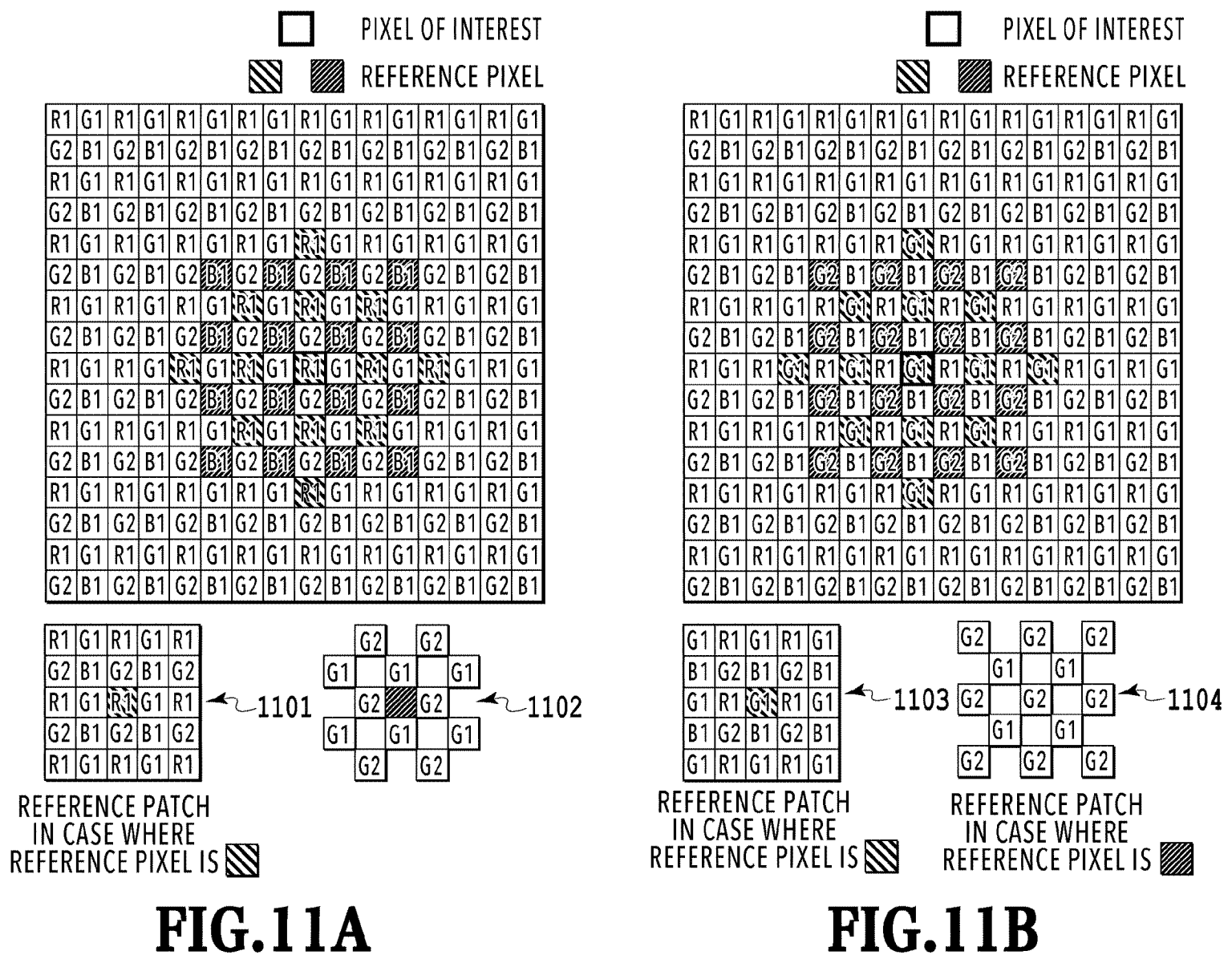
Figures 12A, 12B:
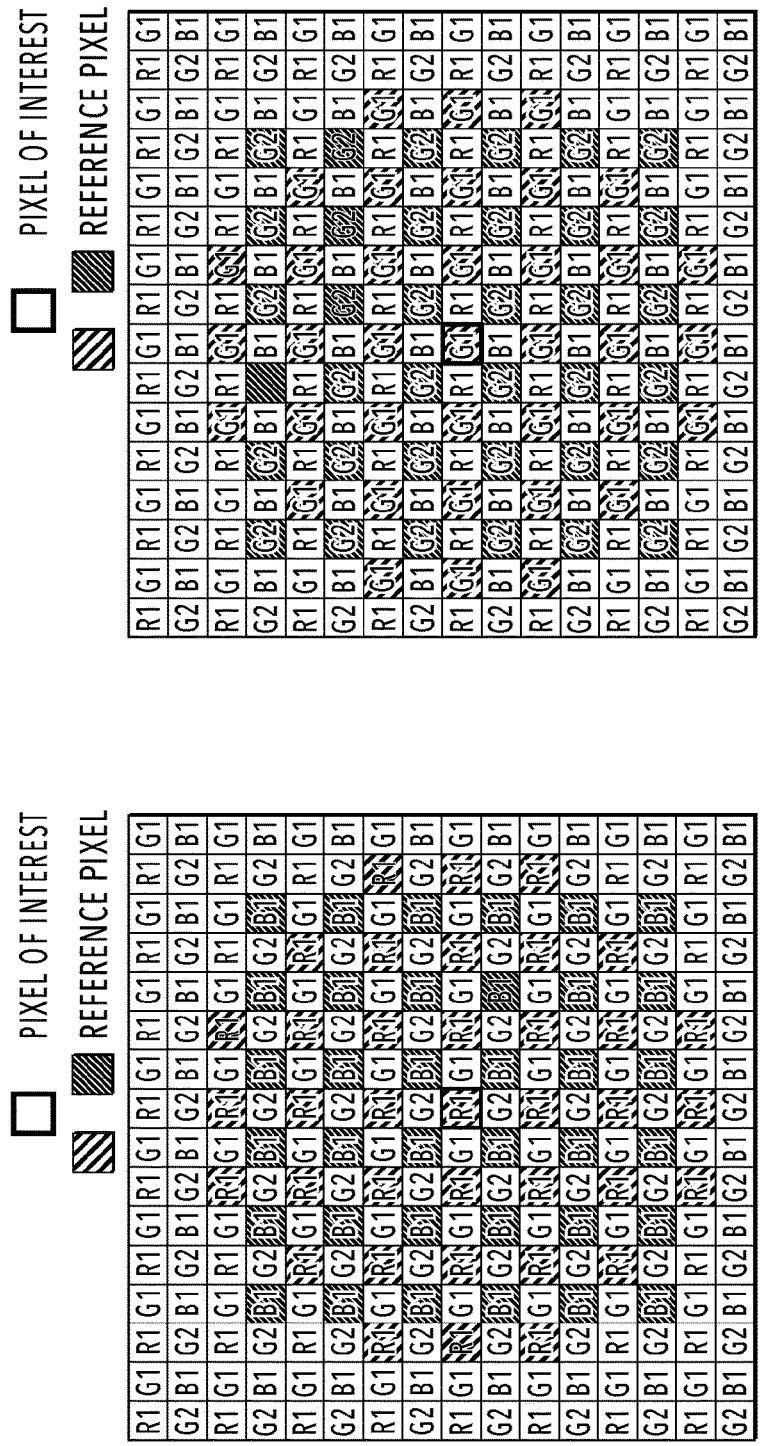
FIG. 12A and FIG. 12B are each a diagram showing an example of a pixel of interest, reference pixels, and reference patches, which are set in a method of the first embodiment.

Further, in a case where the number of reference pixels whose label is the same as that of the pixel of interest and the number of reference pixels whose label is different from that of the pixel of interest are equal, the suppression effect of pattern noise becomes very strong. Further, by selecting the reference pixel from the position near to the pixel of interest and setting the reference pixel at the position in point symmetry with respect to the pixel of interest, a good effect is obtained. In FIG. 11A, FIG. 11B, FIG. 12A, and FIG. 12B, other examples of the patch setting capable of suppressing the occurrence of pattern noise are shown. In FIG. 11A and FIG. 11B, FIG. 11A shows a case where the pixel of interest is the R1 pixel and FIG. 11B is a case where the pixel of interest is the G1 pixel respectively, and a case where the pixel of interest is the B1 pixel and a case where the pixel of interest is the G2 pixel are omitted. In FIG. 11A and FIG. 11B, two kinds of reference pixel exist, that is, the reference pixel indicated by slashes in a case where the label is the same as that of the pixel of interest indicated by the thick frame and the reference pixel indicated by different slashes in a case where the label is different from that of the pixel of interest, and the number of reference pixels whose label is the same as that of the pixel of interest is 13 and the number of reference pixels whose label is different from that of the pixel of interest is 16. The difference in the number of reference pixels is three, and in terms of ratio, 55% and 45%, indicating substantially the equal number, and in a case where the difference is such a degree, the pattern noise is almost inconspicuous. FIG. 12A and FIG. 12B are examples in a case where the number of reference pixels is further increased and then the shape of the reference patch is included in a 4×4 rectangular area. In FIG. 12A and FIG. 12B, FIG. 12A shows a case where the pixel of interest is the R1 pixel and FIG. 12B shows a case where the pixel of interest is the G1 pixel respectively, and a case where the pixel of interest is the B1 pixel and a case where the pixel of interest is the G2 pixel are omitted. In FIG. 12A and FIG. 12B, two kinds of reference pixel indicated by slashes also exist and the number of pixels whose label is the same as that of the pixel of interest is 37 and the number of reference pixels whose label is different from that of the pixel of interest is 36. The difference in the number of reference pixels is one and in terms of ratio, 49.3% and 50.7, indicating substantially equal number, and in this case, the pattern noise does not occur.

In the present embodiment, explanation is given by taking the case as an example where one RAW image is input and the noise reduction processing is performed for the RAW image, but it may also be possible to take a plurality of RAW images captured by a plurality of cameras or captured in a time series by a single camera as an input. In this case, the reference patch is set in the plurality of RAW images. At this time, the reference patch is set so to avoid such a situation in which only one of two pixels appears for the pixels whose color of the G component is the same but whose labels are different, such as the G1 pixel and the G2 pixel. This can be implemented by, as shown in FIG. 5A, FIG. 5B, FIG. 6A, and FIG. 6B, setting the reference pixel and the reference patch also in another RAW image. Further, it is also possible to obtain the same effect by setting the reference pixel slightly shifted between different RAW images based on the motion vector indicating the movement between frames in a case where the same object is captured in a time series. At this time, the number of input RAW images is not limited.

Further, in such processing to fill a part of an image, which is missing, it is possible to apply the noise reduction processing described above by regarding the processing as a case where the noise of a partial pixel is extremely large. In this case, it is possible to suppress the occurrence of pattern noise in the area to be filled.

As above, in the present embodiment, the patch of interest, the reference pixel, and the reference patch are set so that both the G1 pixel and the G2 pixel having the same color of the G component are included at an arbitrary pixel position within the reference patch in a case where all the reference patches are overlapped with the position of the reference pixel as a criterion. Due to this, it is made possible to suppress the occurrence of pattern noise.

Second Embodiment

In the first embodiment, the aspect is explained in which the patch-based noise reduction processing is implemented by software. Next, an aspect is explained as a second embodiment in which part of processing is implemented by hardware. Explanation of the portions in common to those of the first embodiment is omitted and in the following, different points are explained mainly.

Figure 13:
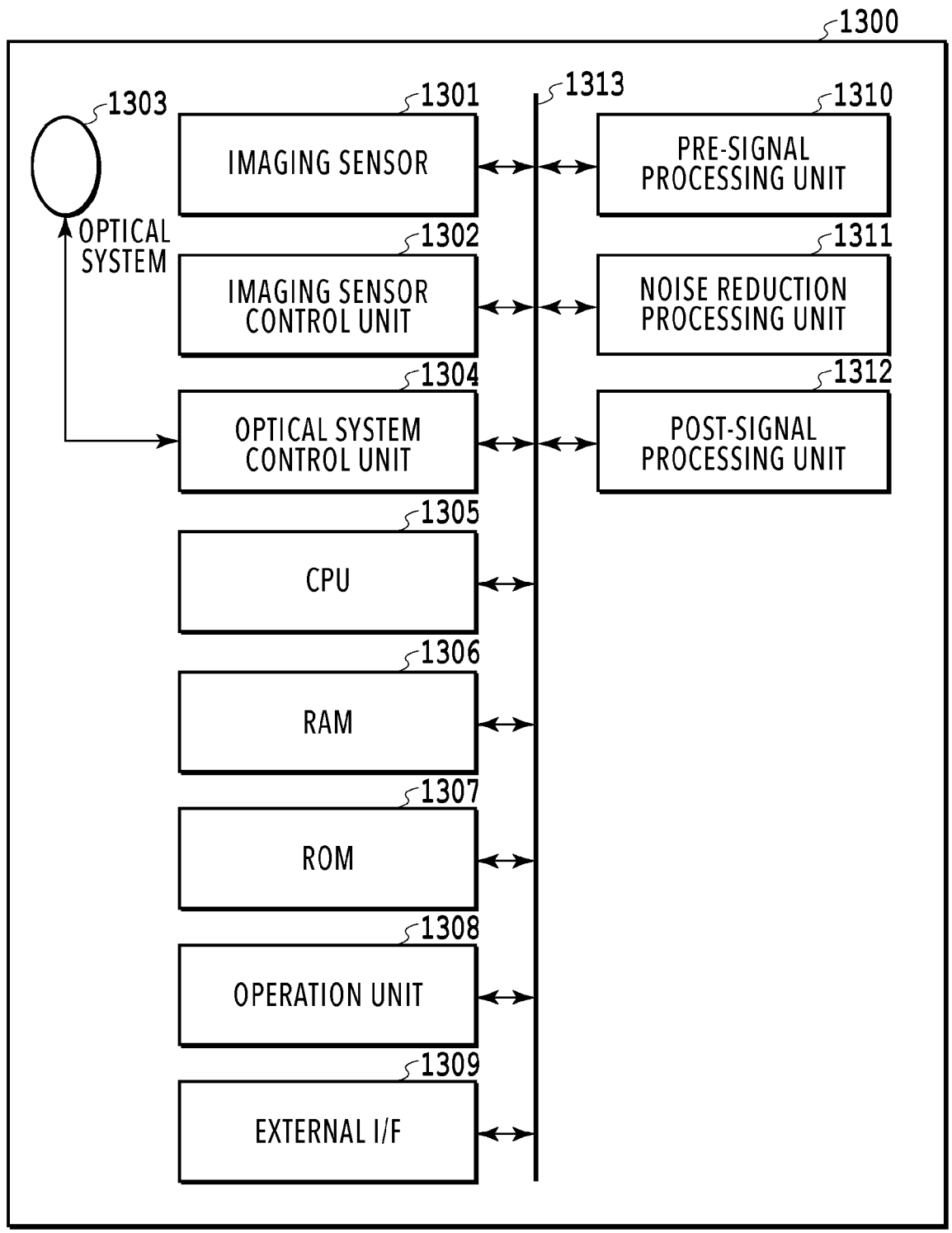
FIG. 13 is a block diagram showing a hardware configuration of an image processing apparatus including a camera according to a second embodiment.

FIG. 13 is a block diagram showing the hardware configuration of an image processing apparatus including a camera according to the present embodiment. An image processing apparatus 1300 shown in FIG. 13 includes an imaging sensor 1301, an imaging sensor control unit 1302 configured to control the imaging sensor 1301, an optical system 1303, and an optical system control unit 1304 configured to control the optical system 1303, and the image processing apparatus 1300 has an image capturing function. A user gives instructions to the image processing apparatus 1300 through an operation unit 1308 and in response to the instructions, a CPU 1305 performs control of the entire image processing apparatus 1300. Specifically, a program read from a ROM 1307 is loaded onto a RAM 1306 and by the CPU 1305 executing the program, the image processing apparatus 1300 is controlled. In a case where a user gives image capturing instructions via the operation unit 1308, the CPU 1305 controls the optical system 1303 and the imaging sensor 1301 through the optical system control unit 1304 and the imaging sensor control unit 1302 and performs image capturing. The data of the image obtained by the imaging sensor 1301 is sent to a pre-signal processing unit 1310 via a bus 1313 and gain correction, defect correction, or the like is applied thereto. In the present embodiment, the image to which the preprocessing is applied is called a RAW image. A noise reduction processing unit 1311 performs the noise reduction processing for the RAW image for which the preprocessing has been performed. Details of the noise reduction processing unit 1311 will be described later. The RAW image after the noise reduction processing is sent to a post-signal processing unit 1312. The post-signal processing unit 1312 performs processing, such as demosaicking, color conversion, and encoding, for the RAW image after the noise reduction. The data of the RAW image for which the post-signal processing such as this has been performed is saved in, for example, a memory card (not shown schematically) through an external I/F 1309.

Figure 14A:
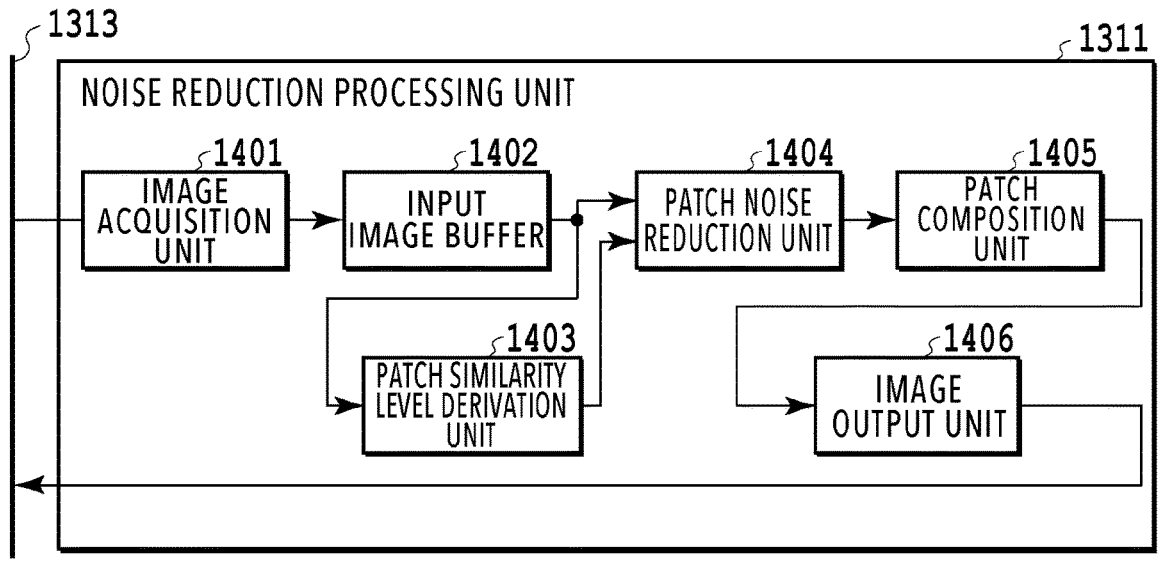
FIG. 14A is a block diagram showing details of a noise reduction processing unit.

FIG. 14A is a block diagram showing details of the noise reduction processing unit 1311 according to the present embodiment. The noise reduction processing unit 1311 includes an image acquisition unit 1401, an input image buffer 1402, a patch similarity level derivation unit 1403, a patch noise reduction unit 1404, a patch composition unit 1405, and an image output unit 1406. In the following each unit is explained.

Figure 14B:
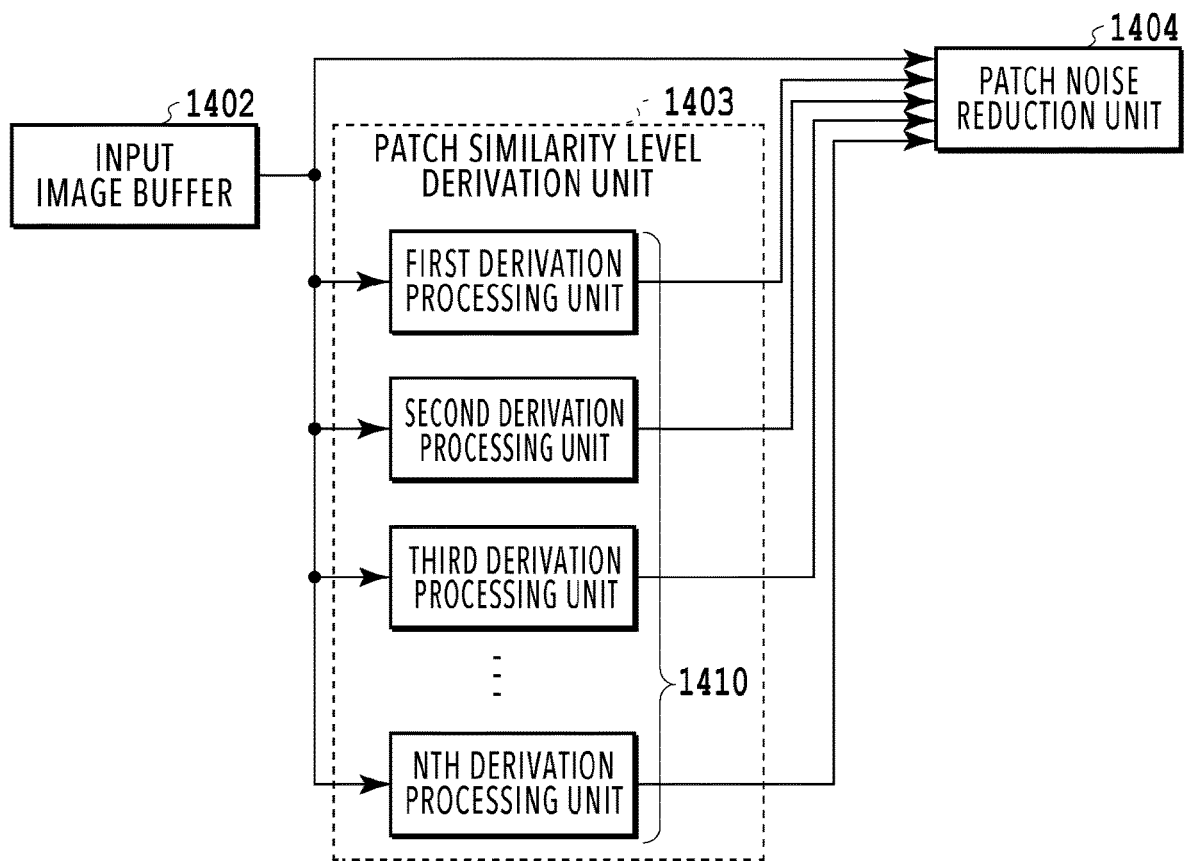
FIG. 14B is a diagram showing details of a patch similarity level derivation unit.

The image acquisition unit 1401 acquires the data of the RAW image generated in the pre-signal processing unit by one pixel each time. The input image buffer 1402 is a buffer storing the pixel data corresponding to a plurality of pixels, which is acquired by the image acquisition unit 1401. The patch similarity level derivation unit 1403 reads the pixel value from the input image buffer 1402 and derives the similarity level for all the reference patches. FIG. 14B shows details of the patch similarity level derivation unit 1403. Here, in a case where it is assumed that there are N reference patches, as shown in FIG. 14B, the patch similarity level derivation unit 1403 internally includes N derivation processing units 1410, that is, the first derivation processing unit 1410 to the Nth derivation processing unit 1410 corresponding to the number of reference patches. Then, by the plurality of the derivation processing units 1410, N similarity levels are derived in parallel for the first reference patch to the Nth reference patch. In this case, the N reference patches are implemented in advance by circuits. At this time, as in the first embodiment, the setting is performed so that both pixels appear irrespective of the label in a case where the pixels have the same color of the G component (see FIG. 5A and FIG. 5B, FIG. 6A and FIG. 6B, FIG. 11A and FIG. 11B, and FIG. 12A and FIG. 12B). Then, control is performed in each of the N circuits so that the shape of the reference patch changes in accordance with the position of the pixel of interest. The patch noise reduction unit 1404 performs the noise reduction processing for each reference patch (similar patch) whose similarity level is higher than or equal to a predetermined value based on the similarity levels derived by the patch similarity level derivation unit 1403. The patch composition unit 1405 includes an internal buffer (not shown schematically) storing the similar patch whose noise is reduced and performs aggregation by using the similar patch after the noise reduction stored in the internal buffer. The image output unit 1406 outputs the data of the pixel whose output value is settled by aggregation.

Figure 15:
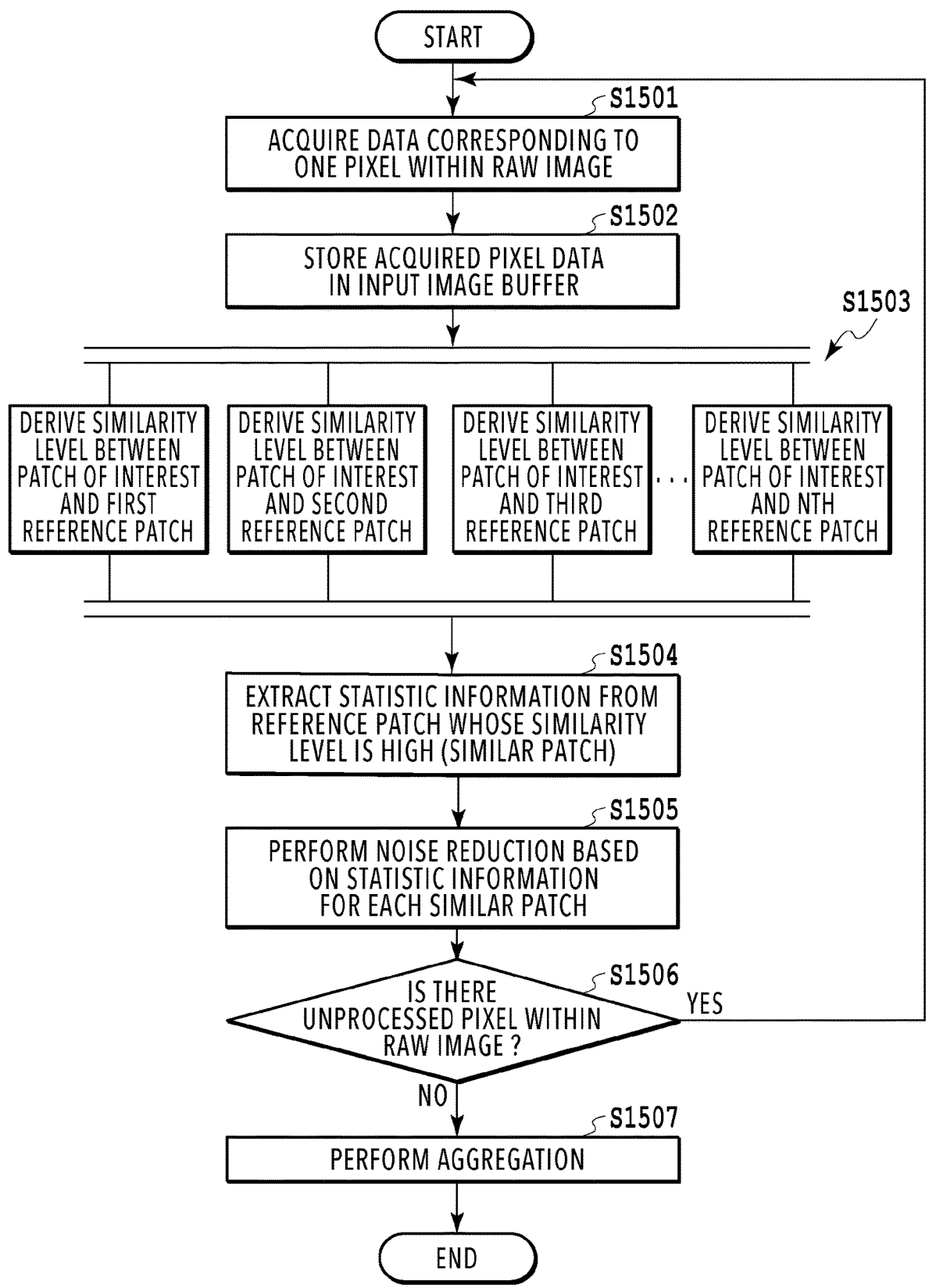
FIG. 15 is a flowchart showing a flow of noise reduction processing according to the second embodiment.

Following the above, a flow of specific processing in the noise reduction processing unit 1311 with the configuration described above is explained. FIG. 15 is a flowchart showing a flow of the noise reduction processing according to the present embodiment. In the following, detailed explanation is given along the flow in FIG. 15.

At step 1501, data corresponding to one pixel of interest is acquired from the RAW image generated by the pre-signal processing unit 1310. At step 1502 that follows, the acquired data of the pixel of interest is stored in the input image buffer 1402. The data of the pixel of interest stored in the input image buffer 1402 is sent to the patch similarity level derivation unit 1403 and the patch noise reduction unit 1404.

At step 1503, the similarity levels between the patch of interest corresponding to the pixel of interest and each of the first to Nth reference patches are derived, respectively. The derivation processing of the similarity level in each of the first to Nth derivation processing units 1410 is performed in parallel as shown in the flow in FIG. 15. The similarity level that is derived here is the same as explained in the first embodiment.

At step 1504, statistic information is extracted from the reference patch (=similar patch) whose similarity level with the pixel of interest is higher than or equal to a predetermined value among the first to Nth reference patches. Then, at step 1505, for each similar patch, the noise reduction processing based on the extracted statistic information is performed. Although not indicated explicitly in the flow in FIG. 15, the noise reduction processing at this step is also performed in parallel.

Then, at step 1506, whether the processing is completed for all the pixels within the RAW image is determined. In a case where there is an unprocessed image, the processing returns to step 1501, and the next pixel is determined to be the pixel of interest and the processing is continued. On the other hand, in a case where the processing is completed for all the pixels, the processing advances to step 1507.

At step 1507, processing (aggregation) to compose a similar patch group after the noise reduction obtained for each pixel configuring the input RAW image is performed and a RAW image for which noise reduction has performed is obtained. The above is the flow of the noise reduction processing.

As above, in the present embodiment, the first to Nth reference patches devised so as not to cause pattern noise are implemented by circuits and set in advance. Then, the noise reduction processing unit reads the RAW image into the input image buffer and the patch similarity level derivation unit derives the similarity level between the patch of interest and each reference patch and performs noise reduction. Due to this, it is possible to obtain the same effect as that in the first embodiment.

Third Embodiment

In the first and second embodiments, the aspect is explained in which the occurrence of pattern noise after the noise reduction processing is avoided in a case where the color filter of the imaging sensor is the Bayer array. Next, an aspect is explained as a third embodiment in which the occurrence of pattern noise after the noise reduction processing is avoided in a case of a color filter whose array is different from the Bayer array. Explanation of the portions in common to those of the first and second embodiments, such as the basic configuration of the image processing apparatus, is omitted and in the following, different points are explained mainly.

The color filter whose array is different from the Bayer array, which is the premise of the present embodiment, is specifically supposed as a color filter having periodicity with the following features.

Having a minimum unit consists of three colors of green (G), red (R), and blue (B).
The above-described minimum unit in arranged repeatedly in the horizontal direction and in the vertical direction.
G is arranged within each line in the horizontal, vertical, and oblique directions of the color filter array.
One or more of Rs or Bs are arranged within each line in the horizontal and vertical directions of the color filter array.
The ratio of G is higher than the ratio of R or B.

Figure 16A:
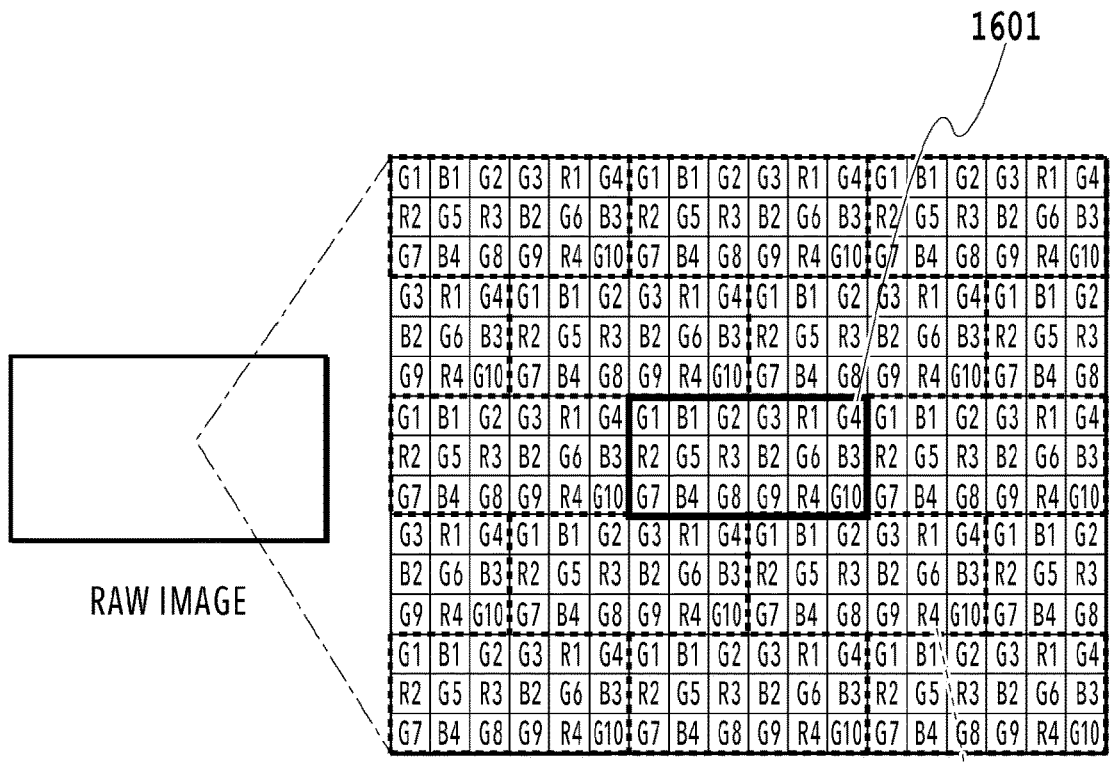
FIG. 16A and FIG. 16B are each an enlarged diagram of a part of a RAW image that is a target of noise reduction processing.
Figure 16B:
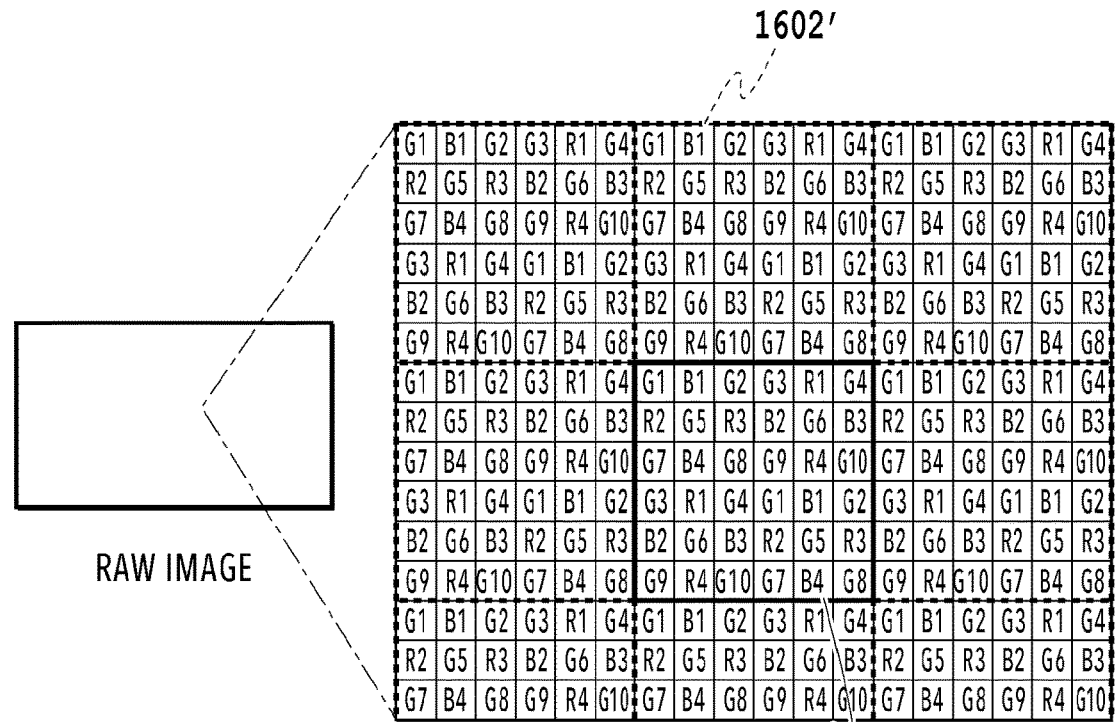

FIG. 16A and FIG. 16B are each an enlarged diagram of a part of a RAW image of the color filter array having the above-described features. In the array of the color filter, which is the premise of the present embodiment, a horizontally-elongated rectangle of 3×6 pixels indicated by a thick frame 1601 is the minimum unit of repetition as shown in FIG. 16A. At this time, the arrangement is such that the minimum unit is repeatedly put side by side with the half of the thick frame 1601 being shifted as indicated by a broken line 1601'. In the array of the color filter shown in FIG. 16A, it is also possible to regard a square of 6×6 pixels indicated by a thick frame 1602 as the minimum unit of repetition as shown in FIG. 16B. In this case, like the Bayer array shown in FIG. 4 of the first embodiment, in the array, the minimum unit is simply repeated as indicated by a broken line 1602', and therefore, it is not necessary to shift the minimum unit as in FIG. 16A.

Here, explanation is given by taking a case as an example where the horizontally-elongated rectangle of 3×6 pixels shown in FIG. 16A is regarded as the minimum unit. Here, among the 18 pixels configuring the minimum unit of 3×6 pixels, which is the minimum unit, there exist 10 pixels having the G component and labels G1 to G10 are attached to each of them. Further, there exist four pixels having the R component and four pixels having the B component and labels R1 to R4 and labels B1 to B4 are attached to each of them. By performing a patch setting as described below for a RAW image captured by an imaging sensor having the array of the color filter such as this, the occurrence of pattern noise at the time of performing the noise reduction processing is avoided.

Figures 17A, 17B:
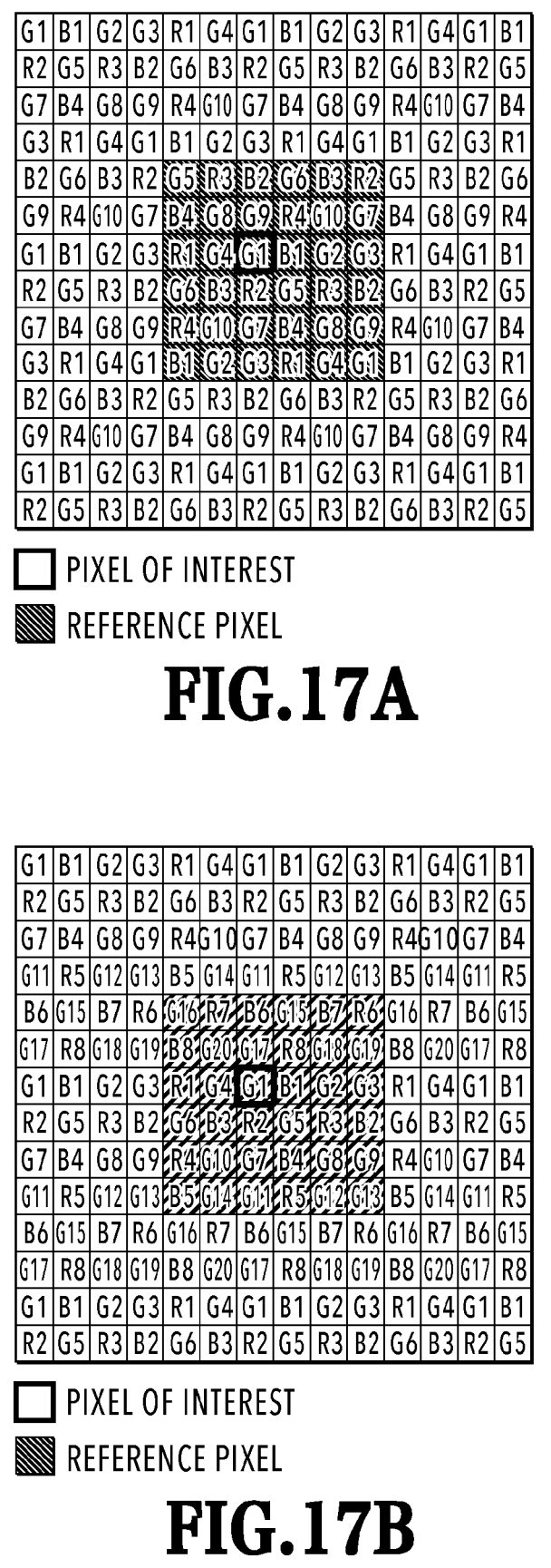
Figure 18:
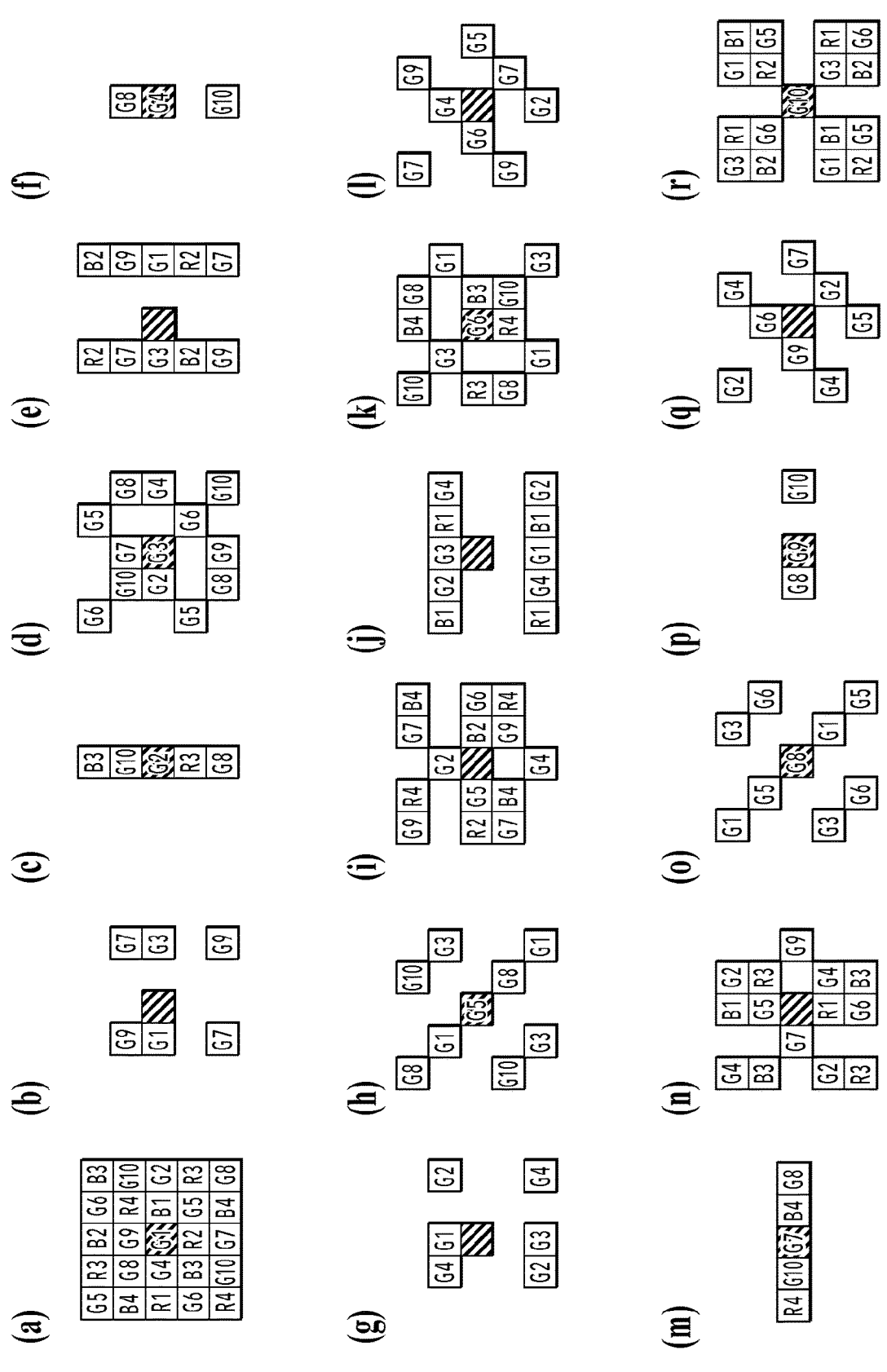
FIG. 18 is a diagram showing an example of a reference patch in the third embodiment.

First, reference pixels for the pixel of interest are set so as to include each of the 18 pixels configuring the minimum unit of 3×6 pixels described above. At this time, the reference pixels are set so that the pixel of interest is located as near to the center as possible. FIG. 17A is a diagram showing an example of the pixel of interest and the reference pixels in the present embodiment in a case where the above-described 3×6 pixels are regarded as the minimum unit. For example, in a case where the pixel of interest is the G1 pixel, the 36 pixels within the range of the 6×6 pixels indicated by slashes are set as the reference pixels. Next, for example, in a 5×5 square area with each of the reference pixels set as described above as a center, the area from which the pixel at the position at which the color does not match that of the patch of interest is excluded is set as a reference patch. FIG. 18(a) to FIG. 18(r) are each a diagram showing an example of the reference patch in a case where the above-described 3×6 pixels are regarded as the minimum unit. By setting the patch shape as shown in each of FIG. 18(a) to FIG. 18(r), the unevenness in the number of times of appearance for each label becomes unlikely to occur in each pixel within the patch. As described above, the 18 kinds of shape of the reference patch exist, and therefore, 18 kinds of shape of the patch of interest corresponding thereto respectively also exist. It is also possible to set the reference patch similarly also in a case where the pixel of interest is the G2 pixel to the G10 pixel, the R1 pixel to the R4 pixel, and the B1 pixel to the B4 pixel. In the case of the present embodiment, there are 18 kinds of reference patch for one kind of pixel of interest, and therefore, there are a total of 324 combinations, that is, 18 kinds of pixel of interest×18 kinds of reference patch. In the present embodiment, the 324 combinations are programmed in advance and read into the RAM 102 at the time of start of the noise reduction processing. Then, in the reference patch setting module 203, the reference patch in accordance with the pixel of interest and the reference pixels is set based on the combinations read into the RAM 102.

As described above, the patch setting is performed so that no difference in the number of times of appearance arises in a case where the number of times of appearance of the R1 pixel to the R4 pixel, the G1 pixel to the G10 pixel, and the B1 pixel to the B4 pixel is counted in all the reference patches at an arbitrary pixel position within the reference patch. Due to this, it is possible to avoid the occurrence of pattern noise.

Figure 19:
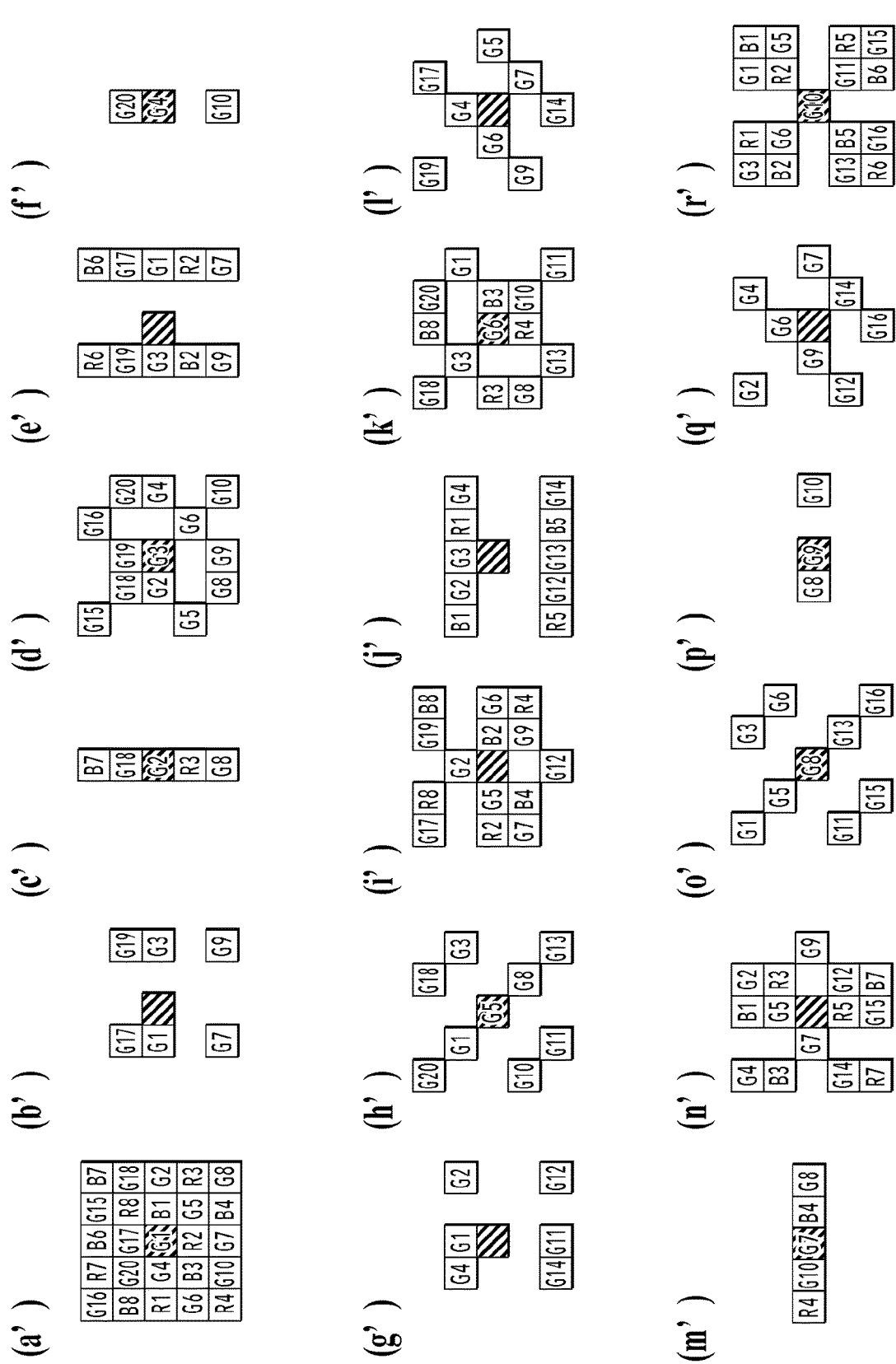
FIG. 19 is a diagram showing an example of a reference patch in the third embodiment.
Figure 20:
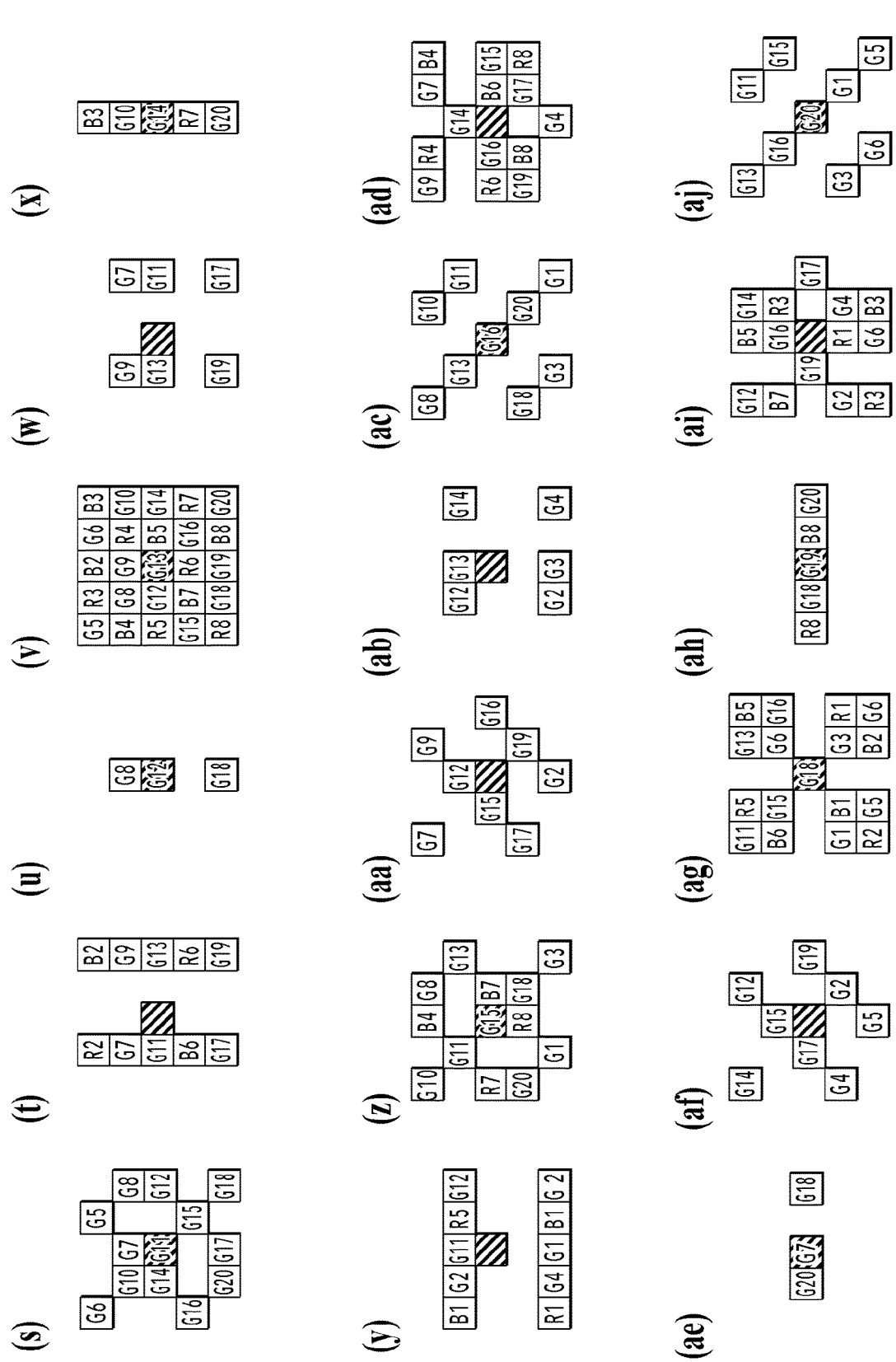
FIG. 20 is a diagram showing an example of a reference patch in the third embodiment.

In a case where the square of 6×6 pixels shown in FIG. 16B is regarded as the minimum unit of repetition, the situation will be as follows. First, as shown in FIG. 17B, the pixel of interest and the reference pixels are set. Then, as shown in FIG. 19(a') to FIG. 19(r') and FIG. 20(s) to FIG. 20(aj), by setting 36 kinds of reference patch for one kind of pixel of interest, the unevenness in the number of times of appearance for each label becomes unlikely to occur in each pixel within the patch. In this case, it is sufficient to perform the patch setting so that no difference in the number of times of appearance occurs in a case where the number of times of appearance of the R1 pixel to the R8 pixel, the G1 pixel to the G20 pixel, and the B1 pixel to the B8 pixel is counted in all the reference patches at an arbitrary pixel position within the reference patch.

Fourth Embodiment

In the first to third embodiments, in order to prevent the occurrence of pattern noise, the patch setting is performed so that the numbers of times of appearance of the pixels to which different labels are attached although the pixels are the same color of the G component do not become uneven at an arbitrary pixel position within the reference patch.

Next, an aspect is explained as a fourth embodiment in which the occurrence of pattern noise is prevented by deriving the similarity level between the patch of interest and the reference patch with the patch setting being left as before and excluding a part of pixels of the reference patch, which cause unevenness in the number of times of appearance at the time of performing the noise reduction processing of the similar patch. Explanation of the portions in common to those of the first embodiment is omitted and in the following, different points are explained mainly.

Figure 21:
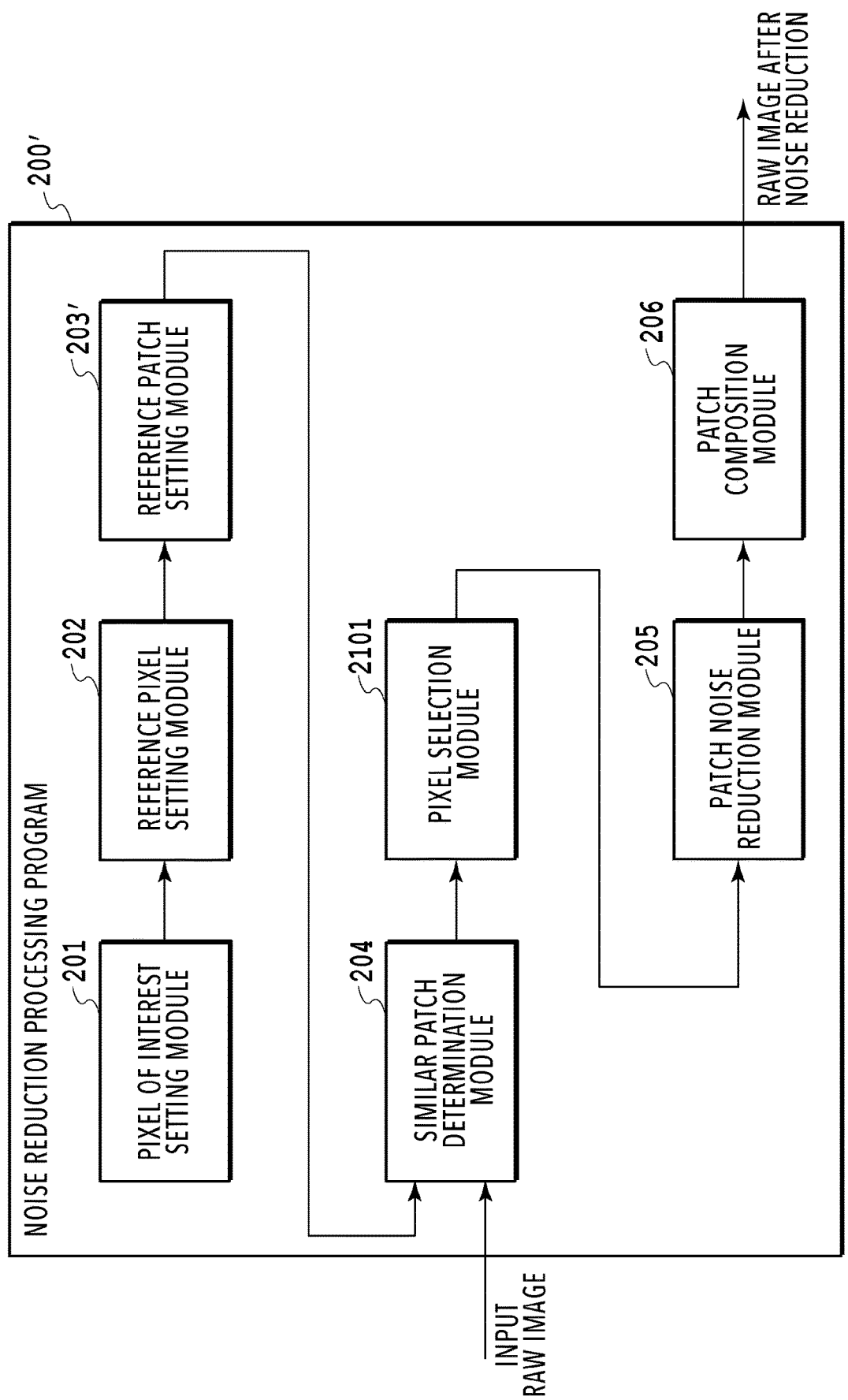
FIG. 21 is a block diagram showing details of a noise reduction processing program according to a fourth embodiment.

FIG. 21 is a block diagram showing details of a noise reduction processing program according to the present embodiment. A noise reduction processing program 200' includes each module, that is, the pixel of interest setting module 201, the reference pixel setting module 202, a reference patch setting module 203', the similar patch determination module 204, a pixel selection module 2101, the patch noise reduction module 205, and the patch composition module 206. The pixel of interest setting unit 201 and the reference pixel setting module 202 are the same as those in the first embodiment. Based on the pixel of interest and the reference pixels set by both the modules, the reference patch setting module 203' of the present embodiment performs the conventional patch setting (see FIG. 8A, FIG. 8B, FIG. 9A, and FIG. 9B) that may cause pattern noise to occur. Then, the similar patch determination module 204 finds the similarity level with the patch of interest for the set reference patch and determines the similar patch. In a case where the similar patch is determined, the pixel selection module 2101 selects a pixel whose unevenness in the number of times of appearance is small as a pixel used in the noise reduction processing from among the pixels configuring the similar patch. Specifically, for example, for the Bayer array, the pixel selection module 2101 selects the pixel at the position at which both the G1 pixel and the G2 pixel to which different labels are attached although the GI pixel and the G2 pixel are the same color of the G component appear in a case where the plurality of reference patches is overlapped. The patch noise reduction module 205 performs the noise reduction processing for the similar patch including the pixel group selected by the pixel selection module 2101. Then, the patch composition module 206 performs aggregation of the similar patch whose noise is reduced.

Here, specific explanation is given by taking a case as an example where the reference patches shown in FIG. 8A, FIG. 8B, FIG. 9A and FIG. 9B described previously are set by the conventional method for the input RAW image of the Bayer array. In this case, the number of times of appearance of the G1 pixel and that of the G2 pixel are as shown in FIG. 10A to FIG. 10D as described previously. As is obvious from FIG. 10A and FIG. 10D, in a case where the pixel of interest is the R1 pixel and the B1 pixel, the pixel exists for which the number of times of appearance of the G1 pixel and that of the G2 pixels are a combination of 25 times and zero times, and therefore, there is large unevenness in the number of times of appearance. In a case where the noise reduction processing is performed for the similar patch such as this, pattern noise occurs. Consequently, in the present embodiment, in a case where the pixel of interest is the R1 pixel and the B1 pixel, the GI pixel and the G2 pixel for which there is large unevenness in the number of times of appearance are excluded from the pixels configuring the similar patch. That is, a patch that selects only the R1 pixels and the B1 pixels from the similar patch is generated and this is taken as the noise reduction processing target-patch. FIG. 22A to FIG. 22D show noise reduction processing target-patches generated from each reference patch (similar patch) in FIG. 10A to FIG. 10D. In a case where the pixel of interest is the G1 pixel and the G2 pixel, there is no extreme unevenness in the number of times of appearance of the G1 pixel and that of the G2 pixel, and there, the pixels are taken as the pixels that are used in the noise reduction processing as they are. As described above, by excluding the pixel at the position at which there is large unevenness in the number of times of appearance of the pixel having the G component from the similar patch, it is possible to avoid the occurrence of pattern noise.

Figure 23:
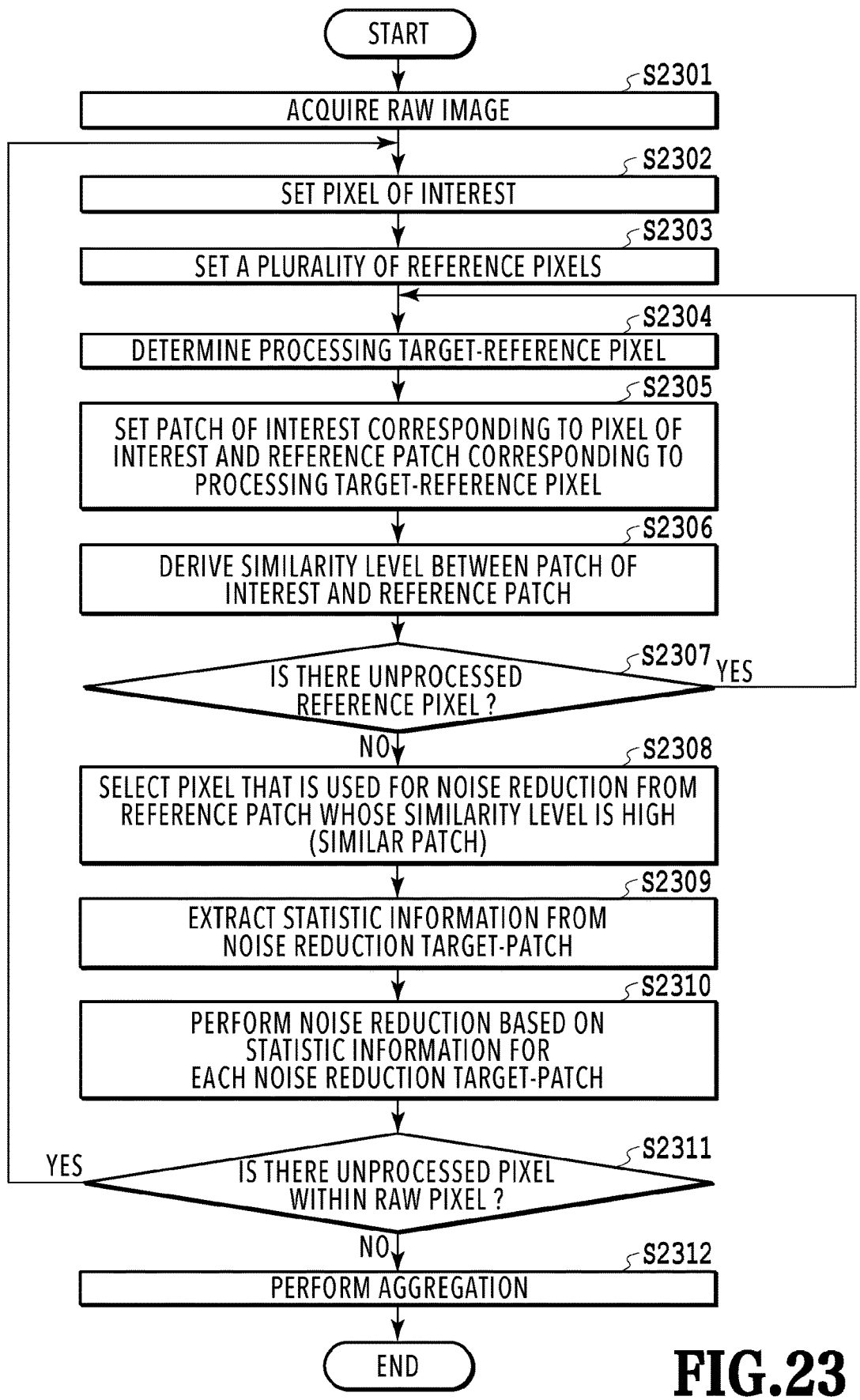
FIG. 23 is a flowchart showing a flow of noise reduction processing according to the fourth embodiment.

Following the above, a flow of specific processing of the noise reduction processing program 200' with the module configuration described above is explained. FIG. 23 is a flowchart showing a flow of the noise reduction processing according to the present embodiment. In the following, detailed explanation is given along the flow in FIG. 23.

Step 2301 to step 2307 correspond to step 301 to step 307 of the flow in FIG. 3 of the first embodiment. In a case where an input RAW image is acquired (step 2301), a pixel of interest and a plurality of reference pixels are set therefrom (steps 2302 and 2303). Then, in a case where one processing target-reference pixel is determined among the plurality of set reference pixels (step 2304), a patch of interest corresponding to the pixel of interest and a reference patch corresponding to the processing target-reference pixel are set by the conventional method (step 2305). Then, the similarity level with the patch of interest is derived for the set reference patch (step 2306) and the processing at step 2304 and subsequent steps are repeated until there is no unprocessed reference pixel (step 2307).

At step 2308, based on the similarity level derived at step 2306, the reference patch whose similarity level is high (similar patch) is determined and further, the pixels that are used in the noise reduction processing are selected as described above. In this manner, the patch that is the target of the noise reduction processing (noise reduction target-patch) is generated. Then, at step 2309, statistic information is extracted from the noise reduction target-patch.

At step 2310, for each noise reduction target-patch, the noise reduction processing based on the statistic information extracted from each of the noise reduction target-patches is performed. Then, at step 2311, whether the processing is completed for all the pixels within the input RAW image is determined. In a case where there is an unprocessed pixel, the processing returns to step 2302, and the next pixel is determined to be the pixel of interest and the processing is continued. On the other hand, in a case where the processing is completed for all the pixels, the processing advances to step 2212. Then, at step 2312, aggregation to compose the patch group after the noise reduction, which is obtained for each pixel configuring the input RAW image, is performed and a RAW image for which noise reduction has been performed is obtained.

The above is the contents of the noise reduction processing according to the present embodiment, which is implemented by the noise reduction processing program 200'. The feature of the present embodiment is that the pixel having a strong possibility of causing pattern noise to occur and whose number of times of appearance is largely uneven is removed before aggregation. Consequently, what is required is the capability of removing such a pixel before aggregation, and therefore, the above-described processing order is not limited. For example, although the amount of calculation becomes large, it may also be possible to perform the selection of pixels described above for the similar patch group whose noise is reduced after performing the noise reduction processing for the similar patch.

As above, also by the present embodiment, it is possible to prevent the occurrence of pattern noise accompanying noise reduction processing for a RAW image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus that reduces noise of an image, the image processing apparatus comprising:
   one or more memories storing instructions:
   one or more processors executing the instructions to:
   set a pixel of interest and a plurality of reference pixels for the pixel of interest among pixels configuring the image;
   set a patch of interest configured by a plurality of pixels with the pixel of interest as a criterion;
   set a plurality of reference patches configured by a plurality of pixels with each of the plurality of reference pixels as a criterion; and
   perform noise reduction processing based on the patch of interest and the plurality of reference patches,
   wherein:
   the image has a color for each pixel, which corresponds to a color filter array, and is an image in which a unit pixel group including pixels corresponding to a plurality of color components is arranged repeatedly,
   the color filter array has periodicity in which an ID indicates a position relationship for the color filter array,
   in the unit pixel group, a plurality of pixels exists for at least one color, and
   in setting the plurality of reference patches, for the patch of interest, a first reference patch is set to which a pixel whose color array of peripheral pixels and whose color component are the same corresponds and a second reference patch is set to which a pixel whose color array of peripheral pixels are different but whose color component is the same corresponds,
   wherein if different IDs are assigned to pixels of the first reference patch and pixels of the second reference patch, each of said first and second reference patch is set so that the distribution of the IDs of the pixels of the same color is same at the positions of the pixels constituting each reference patch.

2. The image processing apparatus according to claim 1, wherein
   the noise reduction processing comprises:
   deriving a similarity level with the patch of interest from the plurality of reference patches;
   performing patch noise reduction processing for a reference patch as a target, whose derived similarity level is higher than or equal to a predetermined threshold value; and
   generating a RAW image whose noise is reduced by performing aggregation using a noise reduced reference patch.

3. The image processing apparatus according to claim 2, wherein
   the similarity level is a sum of difference absolute values or a sum of difference squares of pixel values of pixels configuring each reference patch.

4. The image processing apparatus according to claim 2, wherein
   the first reference patch and the second reference patch are reference patches different in shape,
   the noise reduction processing further comprises extracting statistic information from a reference patch whose similarity level is higher than or equal to a predetermined value based on a difference in shape of the reference patch, and
   the patch noise reduction processing performs noise reduction processing for each similar patch whose derived similarity level is higher than or equal to the predetermined threshold value based on the extracted statistic information.

5. The image processing apparatus according to claim 4, wherein
   the noise reduction processing comprises noise reduction processing by using an NL-Bayes method and
   the statistic information is an average value or a covariance matrix of a reference patch whose similarity level is higher than or equal to a predetermined value and in a case where the average value or the covariance matrix is found, a pixel not included in the reference patch is not used.

6. The image processing apparatus according to claim 1, wherein
   the reference pixel is set in point symmetry with respect to the pixel of interest.

7. The image processing apparatus according to claim 1, wherein
   the color filter array having periodicity is a Bayer array.

8. The image processing apparatus according to claim 1, wherein
   the color filter array having periodicity has a minimum unit consisting of three colors of green, red, and blue and
   in the color filter array:

the minimum unit is arranged repeatedly in a horizontal direction and a vertical direction;
green is arranged within a line in horizontal, vertical, and oblique directions of the color filter array;
one or more reds or blues are arranged within each line in horizontal and vertical directions of the color filter array; and
a ratio of green is higher than a ratio of red or blue.

9. The image processing apparatus according to claim 7, wherein
in a case where a position in the minimum unit of the color filter array is the same between the pixel of interest and the reference pixel, the reference patch is configured by pixels of all colors of red, green, and blue and
in a case where a position in the minimum unit of the color filter array is different between the pixel of interest and the reference pixel, the reference patch is configured by only green pixels.

10. The image processing apparatus according to claim 1, wherein
the image is a RAW image before development.

11. The image processing apparatus according to claim 7, wherein
the unit pixel group is configured by a total of four pixels, that is, two pixels corresponding to green, one pixel corresponding to red, and one pixel corresponding to blue and
the second patch is configured by only pixels corresponding to green.

12. The image processing apparatus according to claim 1, wherein
the first reference patch is configured by all pixels included in a predetermined area corresponding to the pixel of interest and
the second reference patch is configured by only pixels corresponding to green.

13. The image processing apparatus according to claim 1, wherein
the second reference patch includes only pixels corresponding to green even though the pixel of interest is a pixel corresponding to a color other than green.

14. The image processing apparatus according to claim 1, wherein
the first reference patch is set into a shape of a rectangular area; and
the second reference patch is set into a shape in which predetermined pixels are thinned from pixels configuring the rectangular area in accordance with the color filter array.

15. The image processing apparatus according to claim 7, wherein
the IDs of the Bayer array include R1, B1, G1 and G2 such that a pixel corresponding to red is taken as an R1 pixel, a pixel corresponding to blue as a B1 pixel, and two pixels corresponding to green are taken as G1 pixel and a G2 pixel respectively in the Bayer array,
in a case where the pixel of interest is the R1 pixel or the B1 pixel, both the R1 pixel and the B1 pixel are included in the setting of the plurality of reference pixels; and
in a case where the pixel of interest is the G1 pixel or the G2 pixel, both the G1 pixel and the G2 pixel are included in the setting of the plurality of reference pixels.

16. An image processing method of reducing noise of a RAW image having a color for each pixel, which corresponds to a color filter array having periodicity in which an ID indicates a position relationship for the color filter array, the image processing method comprising:
a pixel setting step of setting a pixel of interest and a plurality of reference pixels for the pixel of interest among pixels configuring the RAW image;
a patch setting step of setting a patch of interest configured by a plurality of pixels with the pixel of interest as a criterion and a plurality of reference patches configured by a plurality of pixels with each of the plurality of reference pixels as a criterion; and
a noise reduction step of performing noise reduction processing based on the patch of interest and the plurality of reference patches,
wherein:
at the pixel setting step, for one pixel of interest, at least two kinds of pixel whose positions are different in a minimum unit of the color filter array are set as the plurality of reference pixels,
at the patch setting step, for one pixel of interest, at least two kinds of reference patches are set, the two kinds of reference patches including at least a first reference patch and a second reference patch whose shapes are different, and
wherein if different IDs are assigned to pixels of the first reference patch and pixels of the second reference patch, each of said first and second reference patch is set so that the distribution of the IDs of the pixels of the same color is same at the positions of the pixels constituting each reference patch.

17. A non-transitory computer readable storage medium storing a program for causing a computer to perform an image processing method of reducing noise of a RAW image having a color for each pixel, which corresponds to a color filter array having periodicity in which an ID indicates a position relationship for the color filter array, the image processing method comprising:
a pixel setting step of setting a pixel of interest and a plurality of reference pixels for the pixel of interest among pixels configuring the RAW image;
a patch setting step of setting a patch of interest configured by a plurality of pixels with the pixel of interest as a criterion and a plurality of reference patches configured by a plurality of pixels with each of the plurality of reference pixels as a criterion; and
a noise reduction step of performing noise reduction processing based on the patch of interest and the plurality of reference patches,
wherein:
at the pixel setting step, for one pixel of interest, at least two kinds of pixel whose positions are different in a minimum unit of the color filter array are set as the plurality of reference pixels,
at the patch setting step, for one pixel of interest, at least two kinds of reference patches are set, the two kinds of reference patches including at least a first reference patch and a second reference patch whose shapes are different, and
wherein if different IDs are assigned to pixels of the first reference patch and pixels of the second reference patch, each of said first and second reference patch is set so that the distribution of the IDs of the pixels of the same color is same at the positions of the pixels constituting each reference patch.

* * * * *